US010007362B2

(12) United States Patent
Kim et al.

(10) Patent No.: US 10,007,362 B2
(45) Date of Patent: Jun. 26, 2018

(54) ELECTRONIC DEVICE AND METHOD FOR OPERATING ELECTRONIC DEVICE BY ELECTRONIC PEN

(71) Applicant: Samsung Electronics Co., Ltd., Gyeonggi-do (KR)

(72) Inventors: Dong-Woo Kim, Daegu (KR); Jeong-Hun Kim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 69 days.

(21) Appl. No.: 14/831,309

(22) Filed: Aug. 20, 2015

(65) Prior Publication Data
US 2016/0054821 A1 Feb. 25, 2016

(30) Foreign Application Priority Data

Aug. 21, 2014 (KR) .................... 10-2014-0109055

(51) Int. Cl.
*G06F 3/0354* (2013.01)
(52) U.S. Cl.
CPC ................ *G06F 3/03545* (2013.01)
(58) Field of Classification Search
CPC ............... G06F 2200/1632; G06F 3/02; G06F 3/03545; G06F 3/0488; G06F 3/0412
See application file for complete search history.

(56) References Cited

U.S. PATENT DOCUMENTS

| | | | | |
|---|---|---|---|---|
| 6,924,791 | B1* | 8/2005 | Nicolas | G06F 1/1626 178/18.01 |
| 8,890,855 | B1* | 11/2014 | Lee | G06F 1/169 345/156 |
| 2004/0135765 | A1* | 7/2004 | Kinerk | G06F 1/1626 345/156 |
| 2005/0248549 | A1* | 11/2005 | Dietz | G06F 3/016 345/179 |
| 2007/0250920 | A1* | 10/2007 | Lindsay | G06F 21/31 726/7 |
| 2009/0044153 | A1* | 2/2009 | Lindberg | G06F 3/03545 715/864 |
| 2009/0115745 | A1* | 5/2009 | Chuang | G06F 1/1626 345/179 |
| 2010/0053120 | A1* | 3/2010 | Chang | G06F 3/044 345/179 |
| 2010/0315357 | A1 | 12/2010 | Choi et al. | |
| 2011/0012849 | A1* | 1/2011 | Cho | G06F 1/1626 345/173 |
| 2014/0180481 | A1* | 6/2014 | Park | G06F 3/0487 700/275 |

FOREIGN PATENT DOCUMENTS

| | | |
|---|---|---|
| CN | 101466216 | 6/2009 |
| JP | 10260768 | 9/1998 |
| KR | 1020100134331 | 12/2010 |

* cited by examiner

*Primary Examiner* — Amare Mengistu
*Assistant Examiner* — Shawna Stepp Jones
(74) *Attorney, Agent, or Firm* — The Farrell Law Firm, P.C.

(57) ABSTRACT

An electronic device and a method of operating an electronic device are provided. The method includes determine a motion of an electronic pen received in a pen storage unit of the electronic device; in response to the motion of the electronic pen, determining information related to the motion of the electronic pen; and executing at least one function corresponding to the information related to the detected motion of the electronic pen.

20 Claims, 28 Drawing Sheets

ELECTRONIC DEVICE AND METHOD FOR OPERATING ELECTRONIC DEVICE BY ELECTRONIC PEN

PRIORITY

This application claims priority under 35 U.S.C. § 119(a) to a Korean Patent Application filed in the Korean Intellectual Property Office on Aug. 21, 2014 and assigned Serial No. 10-2014-0109055, the entire content of which is incorporated herein by reference.

BACKGROUND OF THE INVENTION

1. Field of the Invention

The present invention relates generally to operating an electronic device by an electronic pen, and more particularly, to an electronic device and a method for recognizing an electronic pen in an electronic device and operating the electronic device using the recognized result.

2. Description of the Related Art

Recently, various electronic devices have been developed in order to use diverse functions such as a photography function, a music function, a video function, a multimedia function, a game function, and a wireless communication function. Some of these electronic devices are provided with a display unit on a front surface thereof, for effective usage of the diverse functions. For example, some recent smart phones have a touch-sensitive display unit (e.g., a touch screen) placed on a front surface thereof.

In addition, various applications (e.g., referred to as "Apps") may be installed and executed in such electronic devices. A plurality of applications may be simultaneously executed in one electronic device, and some applications may be operated as background applications.

A variety of input units (e.g., a touch screen, a button, a mouse, a keyboard, a sensor, and an electronic pen) may be used to execute and control the applications in the electronic devices. An electronic pen, when used as an input unit, may be inserted into or detached from some electronic devices. For example, a user may separate an electronic pen inserted into an electronic device by pulling one end thereof, and then use the electronic pen. Furthermore, the electronic device may determine the use of the electronic pen by identifying whether the electronic pen is detached from the electronic device.

However, when the electronic device simply identifies only the attachment or detachment of the electronic pen, various services may not be provided in conjunction with the attachment or detachment of the electronic pen, and a user interface may be provided irrespective of a user's intentions regarding attachment or detachment of the electronic pen.

SUMMARY OF THE INVENTION

An aspect of the present invention is to provide an electronic device and a method of recognizing an electronic pen in an electronic device, which can determine a motion state and/or a movement location of the electronic pen received in the electronic device, thereby providing various user interfaces appropriate for individual situations.

According to an aspect of the present invention, an electronic device is provided. The electronic device includes a pen storage unit configured to receive an electronic pen; and a processor configured to determine a motion of the electronic pen inserted into the pen storage unit, in response to the motion of the electronic pen, determine information related to the motion of the electronic pen, and execute at least one function corresponding to information related to the detected motion of the electronic pen.

According to another aspect of the present invention, a method of operating an electronic device is provided. The method includes detecting a motion of an electronic pen received in a pen storage unit of the electronic device; in response to the motion of the electronic pen, determining information related to the motion of the electronic pen; and executing at least one function corresponding to the information related to the detected motion of the electronic pen.

According to another aspect of the present invention, a non-transitory computer readable recording medium in which a program to be executed in a computer is recorded is provided. The program includes executable instructions that allow a processor to perform a method including determining a motion of an electronic pen received in a pen storage unit of the electronic device; in response to the motion of the electronic pen, determining information related to the motion of the electronic pen; and executing at least one function corresponding to the information related to the detected motion of the electronic pen.

BRIEF DESCRIPTION OF THE DRAWINGS

The above and other aspects, features, and advantages of the present invention will be more apparent from the following detailed description when taken in conjunction with the accompanying drawings, in which.

DETAILED DESCRIPTION OF EMBODIMENTS OF THE PRESENT INVENTION

Figure 1:
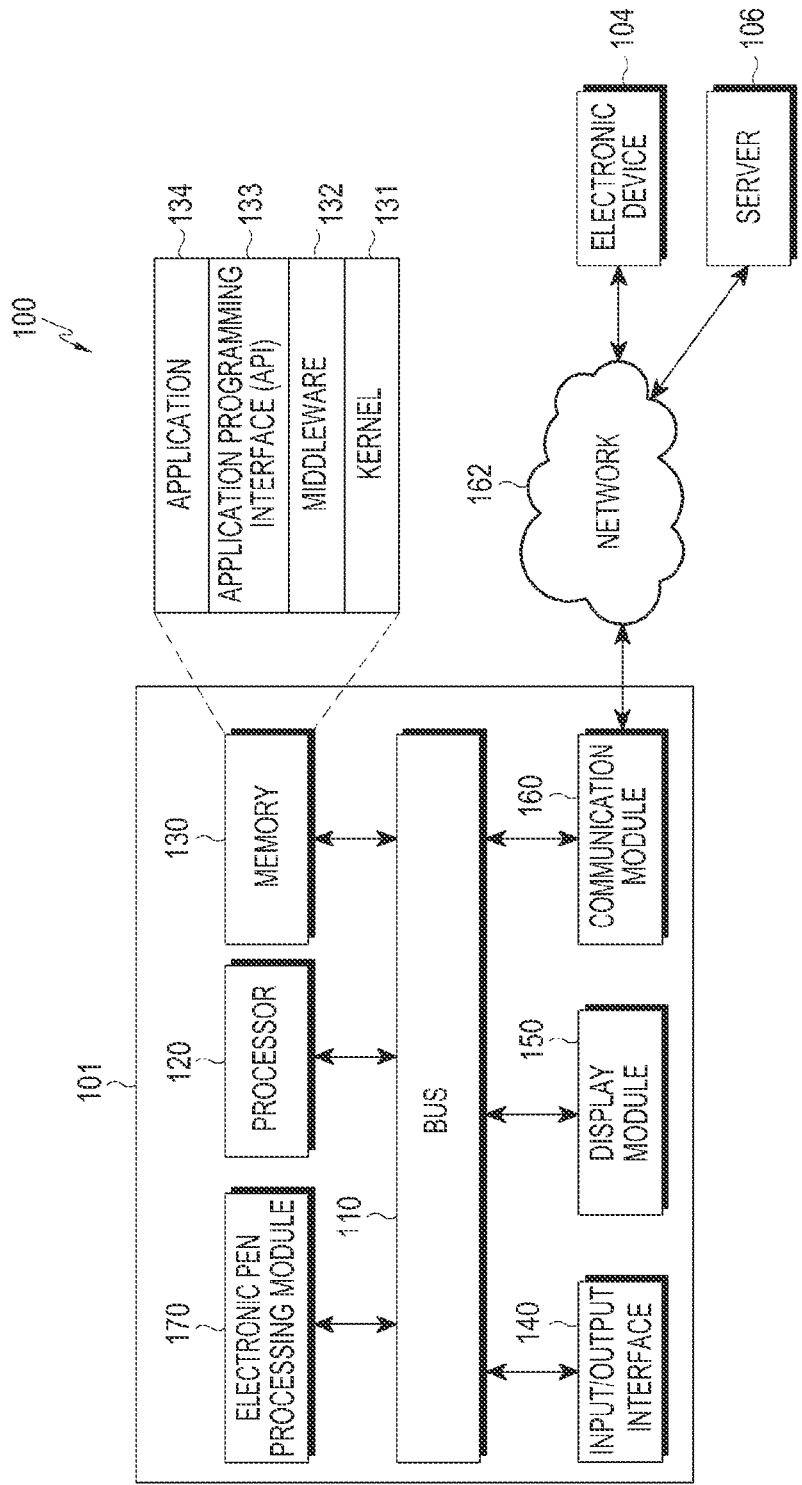
FIG. 1 is a block diagram illustrating a network environment according to an embodiment of the present invention.

Hereinafter, various embodiments of the present invention are described in detail with reference to the accompanying drawings. In the description of the drawings, identical or similar reference numerals may be used to designate identical or similar elements. Detailed descriptions of constructions or processes known in the art may be omitted to avoid obscuring the subject matter of the present invention.

As used herein with respect to various embodiments of the present invention, the expressions "include", "may include" and other corresponding conjugates refer to an existence of a corresponding function, operation, or constituent element. These expressions do not limit one or more additional functions, operations, or constituent elements. Further, as used herein with respect to various embodiments of the present invention, the terms "include", "have" and their corresponding conjugates may be construed to denote a certain characteristic, number, step, operation, constituent element, component or a combination thereof. However, these expressions do not exclude the existence of or a possibility of addition of one or more other characteristics, numbers, steps, operations, constituent elements, components or combinations thereof.

In various embodiments of the present invention, the expression "or" or "at least one of A or/and B" includes any or all of combinations of words listed together. For example, the expression "A or B" or "at least A or/and B" may include A, may include B, or may include both A and B.

While expressions including ordinal numbers, such as "first" and "second", as used in various embodiments of the present invention may modify various constituent elements, such constituent elements are not limited by the above expressions. For example, the above expressions do not limit the sequence and/or importance of the corresponding elements. The expressions may be used to distinguish a component element from another component element. For example, a first user device and a second user device indicate different user devices although both of them are user devices. For example, a first constituent element may be referred to as a second constituent element, and likewise a second constituent element may also be referred to as a first constituent element without departing from the scope of various embodiments of the present invention.

If a component element is described as being "coupled" or "connected" to another component element, the first component element may be directly coupled or connected to the second component, and a third component element may be "coupled" or "connected" between the first and second component elements. Conversely, when one component element is "directly coupled" or "directly connected" to another component element, it may be construed that a third component element does not exist between the first component element and the second component element.

The terms as used herein with respect to various embodiments of the present invention are merely used for the purpose of describing particular embodiments and do not limit the various embodiments of the present invention. As used herein, the singular forms are intended to include the plural forms as well, unless the context clearly indicates otherwise.

Unless defined otherwise, all terms used herein, including technical terms and scientific terms, have the same definition as commonly understood by a person of ordinary skill in the art to which various embodiments of the present invention pertain. Such terms as those defined in a generally used dictionary are to be interpreted to have the same definitions as in the relevant field of art, and are not to be interpreted to have ideal or excessively formal meanings unless clearly defined in various embodiments of the present invention.

An embodiment of the present invention provides an electronic device and a method of operating an electronic device by an electronic pen which can detect an input by the electronic pen inserted into the electronic device or a motion of the electronic pen and perform various functions based on the detected input or motion or provide various user interfaces appropriate for individual situations.

An electronic device according to various embodiments of the present invention may include, but is not limited to, a device including a function of recognizing an electronic pen. The electronic device, for example, may include at least one of a smart phone, a tablet Personal Computer (PC), a mobile phone, a video phone, an e-book reader, a desktop PC, a laptop PC, a netbook computer, a Personal Digital Assistant (PDA), a Portable Multimedia Player (PMP), a Motion Picture Experts Group (MPEG) Audio Layer-3 (MP3) player, a mobile medical device, a camera, and a wearable device (e.g., a Head-Mounted-Device (HMD), (e.g., electronic glasses, electronic clothes, an electronic bracelet, an electronic necklace, an electronic appcessory, an electronic tattoo, a smartwatch, etc.).

An electronic device according to some embodiments of the present invention may include a smart home appliance having a function of recognizing an electronic pen. A smart home appliance is provided as an example of an electronic device that includes at least one of, for example, a television, a Digital Video Disk (DVD) player, an audio system, a refrigerator, an air conditioner, a vacuum cleaner, an oven, a microwave oven, a washing machine, an air cleaner, a set-top box, a TeleVision (TV) box (e.g., Samsung HomeSync™, Apple TV™, or Google TV™), a game console, an electronic dictionary, an electronic key, a camcorder, and an electronic picture frame.

An electronic device according to some embodiments of the present invention may include at least one of various medical appliances (e.g., Magnetic Resonance Angiography (MRA), Magnetic Resonance Imaging (MRI), Computed Tomography (CT), and ultrasonic machines), navigation equipment, a Global Positioning System (GPS) receiver, an Event Data Recorder (EDR), a Flight Data Recorder (FDR), an in-vehicle infotainment device, electronic equipment for ships (e.g., ship navigation equipment and a gyrocompass), avionics, security equipment, a vehicle head unit, an industrial or home robot, an Automatic Teller Machine (ATM) of a banking system, and a Point Of Sales (POS) of a store.

An electronic device according to some embodiments of the present invention may include at least one of furniture or a part of a building/structure, an electronic board, an electronic signature receiving device, a projector, and various types of measuring devices (e.g., a water meter, an electric meter, a gas meter, a radio wave meter, etc.). An electronic device according to various embodiments of the present invention may include a combination of one or more of the aforementioned various devices. Further, an electronic device according to various embodiments of the present invention may be a flexible device. Further, an electronic device according to various embodiments of the present invention is not limited to the aforementioned devices.

According to various embodiments of the present invention, an electronic pen may be an arbitrary pen-shaped device that includes a conductor capable of being recognized by an electronic device. An electronic pen according to embodiments of the present invention may autonomously generate an electric signal such that the electronic device may receive the generated electric signal, or may be implemented such that the electronic device may recognize at least a part of the electronic pen, without generating the electric signal. An electronic pen according to embodiments of the present invention may be embodied in a variety of shapes in addition to the pen shape, and is not limited to a particular shape.

Hereinafter, the electronic device according to the various embodiments will be described with reference to the accompanying drawings. The term "user" used in various embodiments may refer to a person or a device (e.g., an artificial intelligence electronic device) using the electronic device.

FIG. 1 is a diagram illustrating a network environment 100 including an electronic device 101 according to various embodiments of the present invention.

Referring to FIG. 1, the electronic device 101 includes a bus 110, a processor 120, a memory 130, an input/output interface 140, a display 150, a communication interface 160, and an electronic pen processing module 170.

The bus 110 is a circuit that connects the aforementioned elements and transfers communications (e.g., control messages) between the aforementioned elements.

The processor 120 receives instructions from the above-described elements (e.g., the memory 130, the input/output interface 140, the display 150, the communication interface 160, the electronic pen processing module 170, or the like) through, for example, the bus 110, then decodes the received instructions, and performs calculations or data processing according to the decoded instructions.

The memory 130 stores instructions or data received from or created by the processor 120 or other elements (e.g., the input/output interface 140, the display 150, the communication interface 160, the electronic pen processing module 170, etc.). The memory 130 includes programming modules, for example, a kernel 131, a middleware 132, an Application Programming Interface (API) 133, and applications 134. Each of the programming modules described above may be formed of software, firmware, and hardware, or a combination thereof.

The kernel 131 controls or manages system resources (e.g., the bus 110, the processor 120, the memory 130, etc.) that are used in performing operations or functions implemented by other programming modules (e.g., the middleware 132, the API 133, or the applications 134). Furthermore, the kernel 131 provides an interface through which the middleware 132, the API 133, and the applications 134 access individual component elements of the electronic device 101 to control or manage them.

The middleware 132 performs a relay function of allowing the API 133 or the applications 134 to communicate with the kernel 131 to exchange data. Furthermore, in relation to task requests received from the applications 134, the middleware 132 performs a control (e.g., a scheduling or a load-balancing) for the task requests using, for example, a method of assigning a priority for using system resources (e.g., the bus 110, the processor 120, the memory 130, etc.) of the electronic device 101 to at least one of the applications 134.

The API 133 is an interface through which the applications 134 control functions provided by the kernel 131 or the middleware 132, and may include, for example, at least one interface or function (e.g., an instruction) for a file control, a window control, an image processing, a text control, etc.

According to various embodiments of the present invention, the applications 134 may include a Short Message Service (SMS)/Multimedia Message Service (MMS) application, an e-mail application, a calendar application, an alarm application, a health care application (e.g., an application for measuring an amount of exercise or blood sugar), and an environmental information application (e.g., an application for providing an atmospheric pressure, humidity, temperature, etc.). In addition to or as an alternative to the above-described applications, the applications 134 may include an application related to an information exchange between the electronic device 101 and an external electronic device (e.g., an electronic device 104). The application related to the information exchange may include, for example, a notification relay application for transferring particular information to the external electronic device or a device management application for managing the external electronic device.

For example, the notification relay application may include a function of transferring, to the external electronic device 104, notification information generated from other applications of the electronic device 101 (e.g., an SMS/MMS application, an e-mail application, a health management application, an environmental information application, etc.). In addition to or as an alternative to the above-described notifications, the notification relay application may receive notification information from, for example, an external electronic device 104, and may provide the received notification information to a user. The device management application may manage (e.g., install, delete, or update), for example, a function for at least a part of the external electronic device 104 communicating with the electronic device 101 (e.g., turning on/off the external electronic device itself (or some elements thereof) or adjusting brightness (or resolution) of a display), applications operating in the external electronic device, or services provided from the external electronic device (e.g., a telephone call service or a message service).

According to various embodiments of the present invention, the applications 134 may include an application designated depending upon an attribute (e.g., a type) of the external electronic device 104. For example, when the external electronic device is an MP3 player, the application 134 may include an application related to the reproduction of music. Similarly, when the external electronic device is a mobile medical appliance, the applications 134 may include an application related to health care. According to an embodiment of the present invention, the application 134 may include at least one of an application designated to the electronic device 101 and an application received from an external electronic device (e.g., a server 106 or the electronic device 104).

The input/output interface 140 transfers instructions or data input from a user through an input/output device (e.g., the sensor, a keyboard, or a touch screen), to the processor 120, the memory 130, the communication interface 160, or the application control module 170 through, for example, the bus 110. For example, the input/output interface 140 may provide, to the processor 120, data for a user's touch input through the touch screen. Furthermore, through the input/output device (e.g., a speaker or a display), the input/output interface 140 outputs instructions or data received from the processor 120, the memory 130, the communication interface 160, or the application control module 170 through the bus 110. For example, the input/output interface 140 may output voice data processed by the processor 120 to the user through the speaker.

The display 150 displays various types of information (e.g., multimedia data or text data) to a user. In addition, according to various embodiments of the present invention, the display 150 may display an input pad, through which various characters, numbers, and symbols may be input in an input window on a screen, in a variety of ways.

The communication interface 160 connects communication between the electronic device 101 and the external device (e.g., the electronic device 104 or the server 106). For example, the communication interface 160 may be connected with a network 162 through wireless or wired communication to communicate with the external electronic device. The wireless communication may include at least one of, for example, a Wireless Fidelity (Wi-Fi), a Bluetooth (BT), a Near Field Communication (NFC), a Global Positioning System (GPS) and a cellular communication (e.g., a Long Term Evolution (LTE), an LTE-Advanced (LTE-A), a Code Division Multiple Access (CDMA), a Wideband CDMA (WCDMA), a Universal Mobile Telecommunications System (UMTS), a Wireless Broadband (WiBro), a Global System for Mobile communications (GSM), etc.). The wired communication may include at least one of, for example, a Universal Serial Bus (USB), a High Definition Multimedia Interface (HDMI), Recommended Standard 232 (RS-232), and a Plain Old Telephone Service (POTS).

According to an embodiment of the present invention, the network 162 is a communication network. The communication network includes at least one of a computer network, the Internet, the Internet of things, and a telephone network. According to an embodiment of the present invention, a protocol (e.g., a transport layer protocol, a data link layer protocol, or a physical layer protocol) for the communication between the electronic device 101 and the external device may be supported by at least one of the applications 134, the application programming interface 133, the middleware 132, the kernel 131, and the communication interface 160.

In FIG. 1, the electronic device 101 includes the communication interface 160 to communicate with the external electronic device 104 or the server 106 through the network 162. However, according to various embodiments of the present invention, the electronic device 101 may be implemented to operate without a separate communication function.

According to an embodiment of the present invention, the server 106 supports the driving of the electronic device 101 by performing at least one operation (or function) implemented in the electronic device 101. For example, the server 106 may include an electronic pen processing server module that can support the electronic pen processing module 170 implemented in the electronic device 101. For example, the electronic pen processing server module may include at least one element of the electronic pen processing module 170 to perform at least one operation (or function) for the electronic pen processing module 170.

The electronic pen processing module 170 may process at least some information acquired from other elements (e.g., the processor 120, the memory 130, the input/output interface 140, and the communication interface 160) and provide the processed information to the user in various ways.

For example, according to various embodiments of the present invention, the electronic pen processing module 170 detects an input through an electronic pen inserted into the electronic device 101 (e.g., an input through a button included in the electronic pen) or a motion of the electronic pen, and allows various operations to be performed based on the detected input or motion. According to various embodiments of the present invention, when determining that the electronic pen has been moved, the electronic pen processing module 170 provides an operation, an application, or a User Interface (UI) configured in correspondence with the moved location of the electronic pen.

For example, the electronic pen processing module 170 may allow at least one application to be executed through the processor 120 in correspondence to the input through the electronic pen or the motion of the electronic pen (e.g., movement state, rotation state, moved location, or rotated location). In addition, the electronic pen processing module 170 may allow a particular instruction to be executed in at least one application currently running through the processor 120, in correspondence to the input through the electronic pen or the motion of the electronic pen (e.g., movement state, rotation state, moved location, or rotated location). Furthermore, the electronic pen processing module 170 may allow a screen configured through the display 150 to be displayed in correspondence to the input through the electronic pen or the motion of the electronic pen (e.g., movement state, rotation state, moved location, or rotated location). Additional information on the electronic pen processing module 170 will be provided through FIG. 2, descriptions of which will be given below.

Although the electronic pen processing module 170 is illustrated as a module separate from the processor 120 in FIG. 1, at least a part of the electronic pen processing module 170 may be included in the processor 120 or the display 150. Alternatively, all of the functions of the electronic pen processing module 170 may be implemented in the illustrated processor 120 or another processor.

Figure 2:
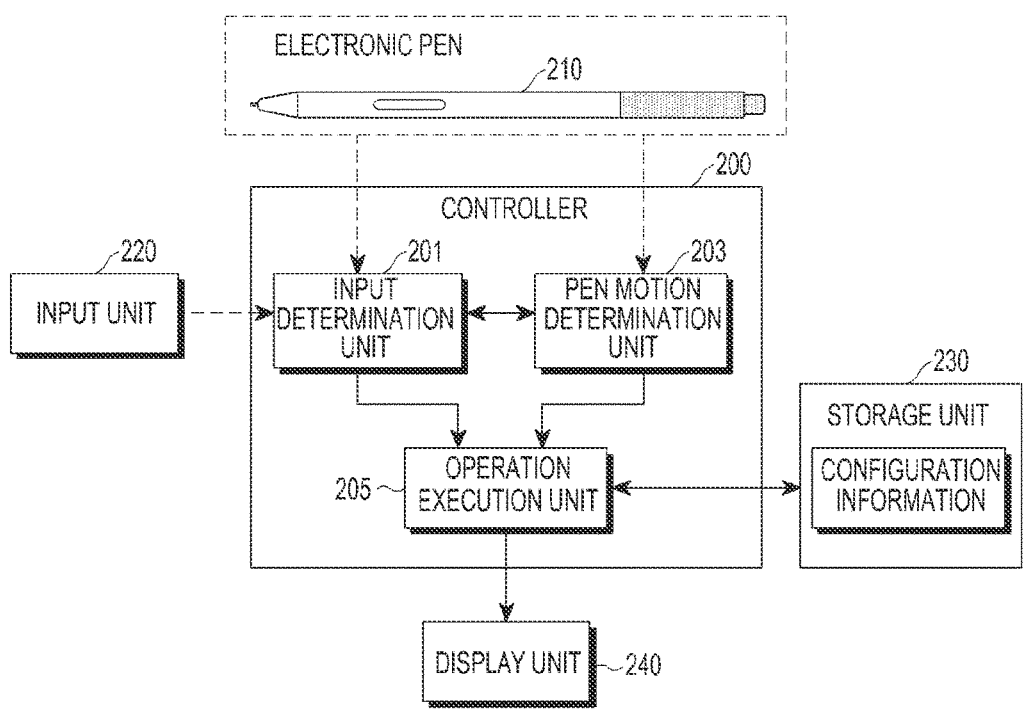
FIG. 2 is a diagram illustrating a configuration example of an electronic device according to an embodiment of the present invention.

FIG. 2 is a block diagram of the electronic pen processing module 170 of the electronic device (e.g., the electronic device 101) according to various embodiments of the present invention. For convenience of description, an example in which the electronic pen processing module 170 is carried out within the processor 120 is described as follows. An element included in a controller 200 of FIG. 2 may be included in the electronic pen processing module 170 or the processor 120 of FIG. 1 in accordance with embodiments of the present invention.

Referring to FIG. 2, the electronic device may include a controller 200, an input unit 220, a storage unit 230, and a display unit 240. The electronic device further includes a detachable electronic pen 210 accommodated in the receiving section thereof. The controller 200 includes an input determination unit 201, a pen motion determination unit 203, and an operation execution unit 205.

The input determination unit 201 determines information input through various types of input units 220 (e.g., a touch pad, a keypad, and a mouse) included in the electronic device. The input determination unit 201 also determines input information detected from the electronic pen 210. For example, when a button provided in the electronic pen 210 is pressed or the entirety or a part of the electronic pen 210 (e.g., a rotatable handle part of the electronic pen 210) is rotated in a predetermined direction, the input determination unit 201 may detect a signal generated or changed according to the operation.

When the electronic pen 210 moves in the longitudinal direction thereof (e.g., in the direction in which the electronic pen is inserted or detached) or rotates while being inserted into a pen storage unit of the electronic device, the pen motion determination unit 203 determines the movement state (e.g., movement or non-movement, a movement direction, a movement speed, a movement distance, and a movement pattern) or the rotation state (e.g., rotation or non-rotation, a rotation direction, a rotation speed, a rotation angle, and a rotation pattern) of the electronic pen. For example, according to various embodiments of the present invention, when the electronic pen 210 moves in the longitudinal direction thereof, the pen motion determination unit 203 may determine the movement state information of the electronic pen 210, such as movement or non-movement, a movement direction, a movement distance, a movement speed, and a movement pattern, or the changed location information of the electronic pen 210. In addition, according to various embodiments of the present invention, when the electronic pen 210 rotates about the longitudinal axis thereof, the pen motion determination unit 203 determines the rotation state information of the electronic pen 210, such as rotation or non-rotation, a rotation direction, a rotation angle, a rotation speed, and a rotation pattern, or the changed rotation information of the electronic pen 210.

According to the motion of the electronic pen 210, the operation execution unit 205 controls to execute the preconfigured operation by referring to the configuration information stored in the storage unit 230, depending upon the information related to the motion of the electronic pen 210 (e.g., the information related to the movement or rotation) determined by the pen motion determination unit 203. In addition, according to various embodiments of the present invention, when the motion of the electronic pen 210 is detected, the operation execution unit 205 also controls to perform the configured function corresponding to the motion of the electronic pen 210 in the current state or mode of the electronic device.

According to various embodiments of the present invention, the operation execution unit 205 controls to perform the configured operation by referring to the configured information stored in the storage unit 230 to correspond to the input detected through the input determination unit 201.

According to various embodiments of the present invention, the display unit 240 displays the operation execution result according to the operation control from the operation execution unit 205. For example, the display unit 240 displays the movement or rotation information of the pen based on the information according to the movement or rotation of the pen, displays an executable application list, or displays the execution result on the configured application.

According to various embodiments of the present invention, various operations (e.g., generating vibration, outputting sound through a speaker, and operations related to a camera module) of the electronic device, as well as the display unit 240 may be controlled according to the operation control of the operation execution unit 205.

According to various embodiments of the present invention, at least some elements of the controller 200 may be included in the electronic pen processing module 170 illustrated in FIG. 1. In addition, according to various embodiments of the present invention, the controller 200 may be at least a part of the processor 120 illustrated in FIG. 1. Furthermore, the controller 200 may include, for example, one of hardware, software, and firmware or a combination of two or more thereof.

According to various embodiments of the present invention, the input unit 220 may correspond to the input/output interface 140 of FIG. 1, the storage unit 230 may correspond to the memory 130 of FIG. 1, and the display unit 240 may correspond to the display 150 of FIG. 1. Furthermore, according to various embodiments of the present invention, the display 150 of the electronic device 101 illustrated in FIG. 1 may be implemented in a touch screen shape, and the input unit 220 and/or the display unit 240 may correspond to the touch screen.

An electronic device according to an embodiment of the present invention may include a pen storage unit; an electronic pen inserted into the pen storage unit; and a processor that controls detection of a motion of the electronic pen inserted into the pen storage unit and execute at least one function configured in correspondence to information related to the detected motion of the electronic pen.

According to various embodiments of the present invention, the information related to the motion of the electronic pen may include one or more selected from movement or non-movement, a movement direction, a movement speed, a movement distance, a movement pattern, and a moved location of the electronic pen.

According to various embodiments of the present invention, the information related to the motion of the electronic pen may include one or more selected from rotation or non-rotation, a rotation direction, a rotation speed, a rotation angle, a rotation pattern, and a rotated location of the electronic pen.

According to various embodiments of the present invention, the electronic device may further include a touch screen panel disposed on a front surface of the electronic device, wherein the touch screen panel may determine the movement of the electronic pen by detecting a metal part provided at one portion of the electronic pen below the touch screen panel.

According to various embodiments of the present invention, the touch screen panel may be bent from an upper portion of the electronic device to extend to one side surface of the pen storage unit, and the motion of the electronic pen may be detected by a region extending to the one side surface of the pen storage unit among regions of the touch screen panel.

According to various embodiments of the present invention, the electronic device may further include a touch panel provided on at least one portion of the pen storage unit, wherein the touch panel may determine the movement of the electronic pen by detecting a metal part provided at one portion of the electronic pen.

According to various embodiments of the present invention, the electronic pen may further include an input unit using a button, and the processor may determine an input by detecting a change in impedance generated according to an input through the button provided in the electronic pen.

According to various embodiments of the present invention, the electronic pen may further include an asymmetric rotating weight therein, and the processor may detect a motion related to rotation of the electronic pen using the asymmetric rotating weight.

According to various embodiments of the present invention, the electronic device may further include at least one magnetic sensor disposed adjacent to the pen storage unit, wherein the magnetic sensor may detect rotation of at least one magnetic body secured to the electronic pen, according to rotation of the electronic pen.

According to various embodiments of the present invention, the electronic device may further include a detection switch that detects separation of the electronic pen inserted into the pen storage unit, wherein the processor may make a control to activate a function for detecting the motion of the electronic pen, when the detection switch detects the separation of the electronic pen.

Figure 3:
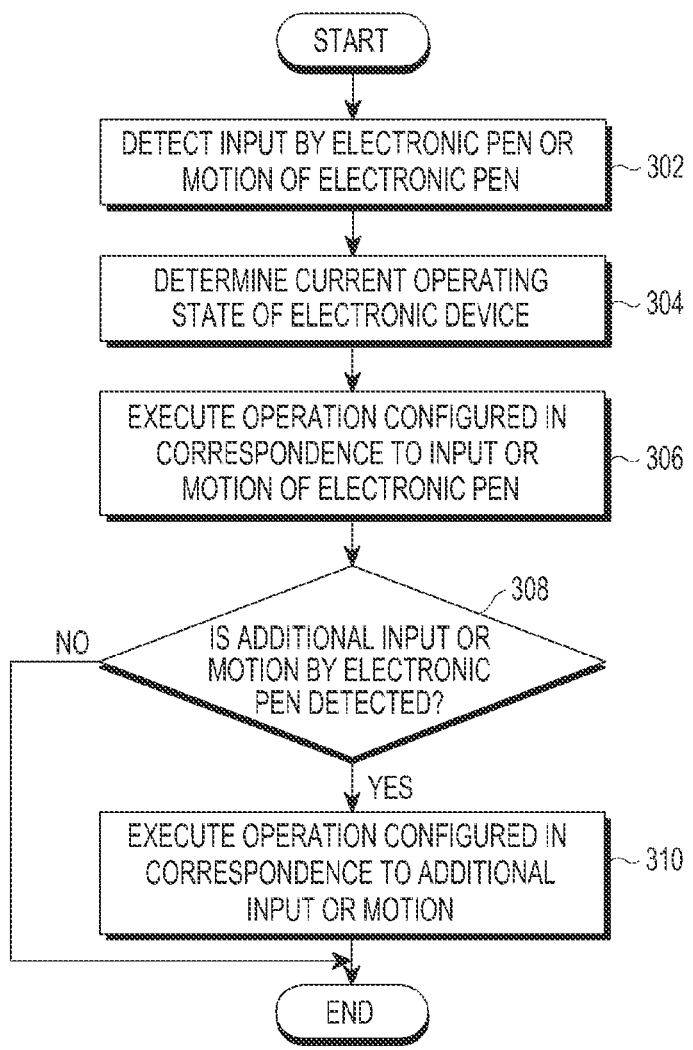
FIG. 3 is a flowchart illustrating an operating procedure of an electronic device according to an embodiment of the present invention.

FIG. 3 is a flowchart illustrating a method of an electronic device according to an embodiment of the present invention.

Referring to FIG. 3, the electronic device detects an input by an electronic pen or a motion (movement or rotation) of the electronic pen, in step 302. The electronic device determines the current operating state thereof, in step 304. Upon detecting the input by the electronic pen or the motion of the electronic pen, in step 306, the electronic device executes an operation configured to correspond to the input information or the detected information. The input information or detected information may include, for example, the movement state (e.g., movement or no-movement, movement direction, movement speed, movement distance, and movement pattern), the moved location, the rotation state (rotation or non-rotation, rotation direction, rotation speed, rotation angle, and rotation pattern), and the rotated location). In addition to, or as an alternative to the above described operations, in step 306, the electronic device may perform a status or standby operation for detecting an additional input or motion.

Upon determining in step 308 that an additional input has been detected from the electronic pen or another input unit of the electronic device, the electronic device executes an operation configured to correspond to the additional input, in step 310. For example, upon detecting an additional input by the electronic pen (e.g., an input of a button included in the pen), an additional motion of the electronic pen (e.g., movement or rotation), or another input of the electronic device (e.g., a screen touch or voice recognition), the electronic device may additionally execute an operation configured to correspond to the additional input information or the additional detected information.

One or more of the operations illustrated in FIG. 3 may be omitted, and/or one or more other operation may be added between the operations. In addition, the operations may be sequentially processed as illustrated in FIG. 3, or the execution sequence of these operations may be switched in accordance with embodiments of the present invention.

A method of operating an electronic device according to one of various embodiments of the present invention may include detecting a motion of an electronic pen received in a pen storage unit of the electronic device; determining information related to the motion of the electronic pen when the motion of the electronic pen is detected; and executing at least one function configured in correspondence to the information related to the motion of the electronic pen.

According to various embodiments of the present invention, the information related to the motion of the electronic pen may include one or more selected from movement or non-movement, a movement direction, a movement speed, a movement distance, a movement pattern, and a moved location of the electronic pen.

According to various embodiments of the present invention, the information related to the motion of the electronic pen may include one or more selected from rotation or non-rotation, a rotation direction, a rotation speed, a rotation angle, a rotation pattern, and a rotated location of the electronic pen.

According to various embodiments of the present invention, the method may further include detecting separation of the electronic pen inserted into the pen storage unit; and activating a function for detecting the motion of the electronic pen when the separation of the electronic pen is detected.

According to various embodiments of the present invention, the method may further include detecting a motion of the electronic pen; displaying, on a screen, at least one application corresponding to information related to the motion of the electronic pen; detecting an additional input through the electronic pen; and executing a function related to an application corresponding to a location where the electronic pen is moved, in response to the additional input through the electronic pen.

According to various embodiments of the present invention, the additional input may be an input detected by at least one of rotation, movement, and a button input of the electronic pen.

According to various embodiments of the present invention, the method may further include detecting a motion of the electronic pen; displaying at least one setting for the electronic device which corresponds to information related to the motion of the electronic pen; detecting an additional input through the electronic pen; and adjusting a setting value corresponding to a location where the electronic pen is moved, in response to the additional input through the electronic pen.

According to various embodiments of the present invention, the method may further include detecting a motion of the electronic pen; determining at least one password corresponding to information related to the motion of the electronic pen; and comparing the at least one password corresponding to the information related to the motion of the electronic pen with a preset unlock password and unlocking the electronic device.

According to various embodiments of the present invention, the method may further include detecting a motion of the electronic pen; detecting a motion pattern according to a motion direction of the electronic pen; and comparing the motion pattern of the electronic pen with a preset pattern and unlocking the electronic device.

Figure 4:
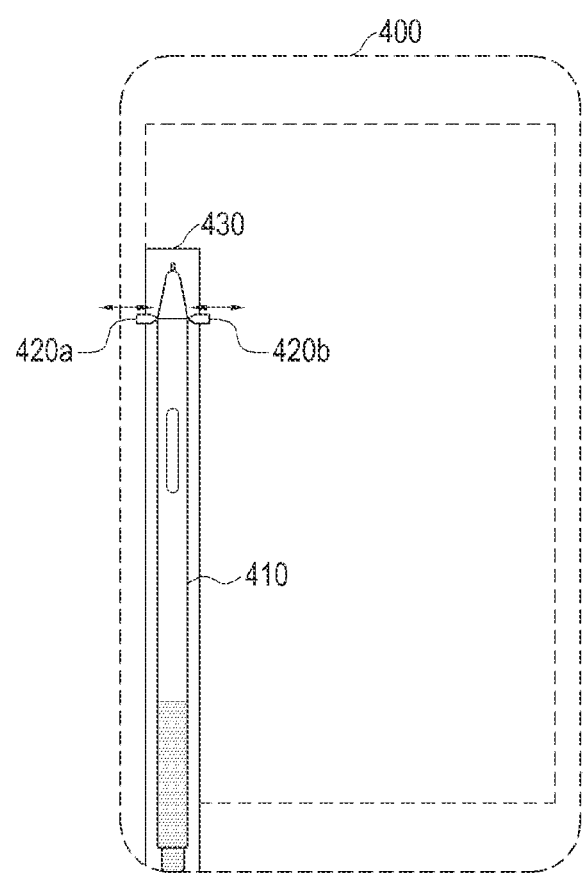
FIG. 4 is a diagram illustrating an electronic device having an electronic pen received therein according to an embodiment of the present invention.

FIG. 4 is a diagram illustrating an electronic device having an electronic pen received therein according to an embodiment of the present invention.

Referring to FIG. 4, an electronic device 400 is provided with a pen storage unit 430 that receives an electronic pen 410. When the electronic pen 410 is accommodated in the pen storage unit 430 as illustrated in FIG. 4, at least one of detection switches 420a and 420b detects that the electronic pen 410 is accommodated in the pen storage unit 430. In addition, when the electronic pen 410 is detached from the pen storage unit 430, at least one of detection switches 420a and 420b detects that the electronic pen 410 is detached from the pen storage unit 430.

Figure 5:
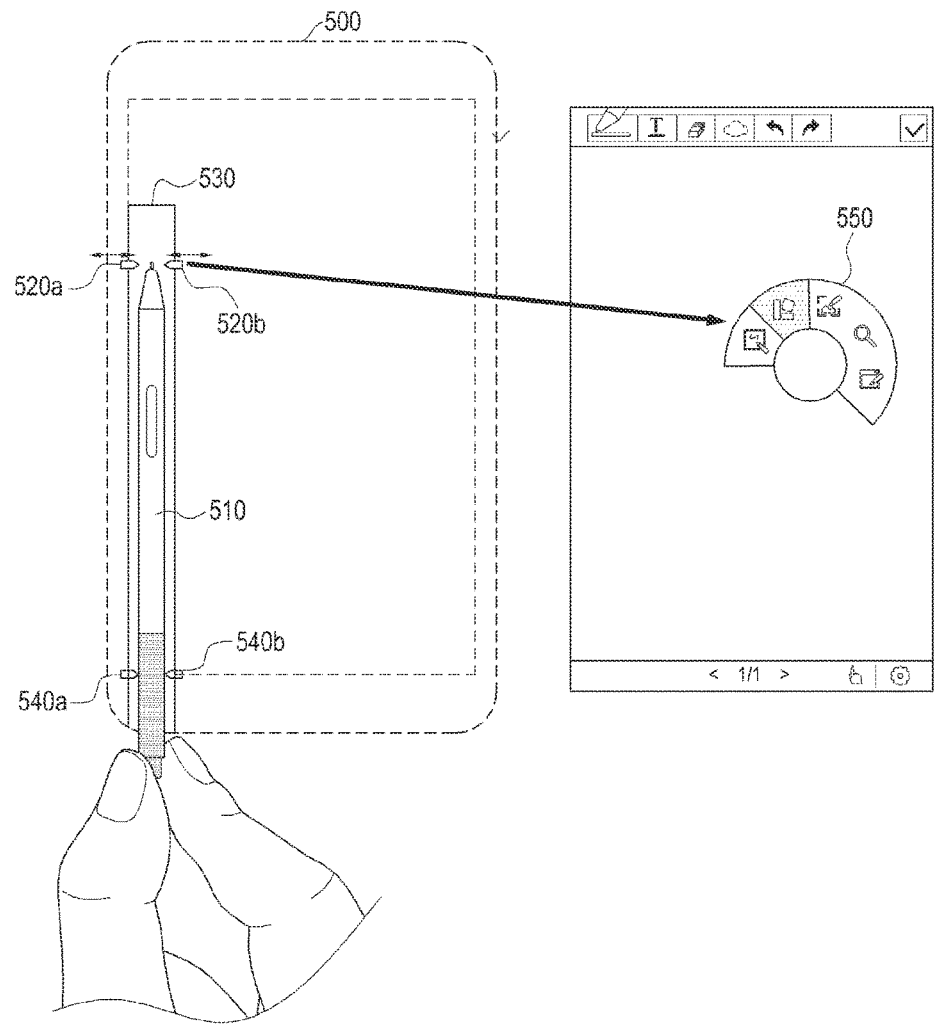
FIG. 5 is a diagram illustrating an operation of an electronic device corresponding to a motion of an electronic pen according to an embodiment of the present invention.

FIG. 5 is a diagram illustrating an operation of an electronic device corresponding to a motion of an electronic pen according to an embodiment of the present invention.

Referring to FIG. 5, an electronic device 500 includes one or more switches 520a, 520b, 540a, and 540b for detecting detachment of an electronic pen 510. When the electronic pen 510 accommodated in the electronic device 500 starts to be detached from a pen storage unit 530 by pulling the electronic pen 510 by hand, at least one of the first detection switches 520a and 520b detects that the detachment of the electronic pen 510 is initiated, and various functions configured to correspond to the detachment of the electronic 510 may be performed. For example, as illustrated in FIG. 5, an execution menu 550 for at least one configured application is displayed on a screen according to the detachment of the electronic pen 510.

According to various embodiments of the present invention, when the electronic pen 510 is completely detached from the pen storage unit 530 by continuing to pull the electronic pen 510, at least one of the second detection switches 540a and 540b detects that the detachment of the electronic pen 510 is completed, and various functions configured to correspond to the completed detachment are performed. For example, when at least one of the second detection switches 540a and 540b detects that the pen 510 is completely detached from the pen storage unit 530, the execution menu 550 for at least one configured application may be displayed on the screen as illustrated in FIG. 5.

According to various embodiments of the present invention, at least one of the first detection switches 520a and 520b, or at least one of the second detection switches 540a and 540b configure a trigger point for detecting the motion of the electronic pen 510. For example, when the electronic pen 510 is completely inserted into the pen storage unit 530, the electronic device 500 may be configured to not detect the motion of the electronic pen 510, and when at least one of the first detection switches 520a and 520b detects that the detachment of the electronic pen 510 is initiated, various sensors may be operated for detecting the motion of the electronic pen 510. In addition, according to various embodiments of the present invention, when at least one of the second detection switches 540a and 540b detects that the electronic pen 510 is completely detached from the pen storage unit, the various sensors for detecting the motion of the electronic pen 510 stops operations thereof, thereby reducing power consumption of the electronic device 500.

According to various embodiments of the present invention, detection switches may be placed only at the upper or lower end of the pen storage unit 530. In this case, when at least one detection switch detects the motion of the pen 510, the sensors start to detect the motion of the electronic pen 510, and when the motion of the electronic pen 510 is not detected through the sensors, the electronic pen 510 is determined to be completely detached from the pen storage unit 530, and the operations of the sensors may be stopped.

Figure 6:
FIG. 6 is a diagram illustrating a structure of an electronic pen according to various embodiments of the present invention.
Figure 7:
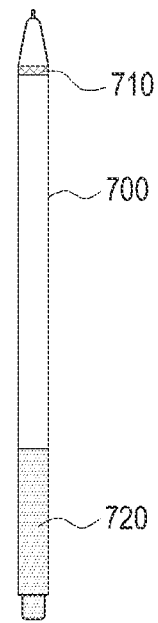
FIG. 7 is a diagram illustrating a structure of an electronic pen according to various embodiments of the present invention.

FIGS. 6 and 7 illustrate structures of an electronic pen according to various embodiments of the present invention.

Referring to FIG. 6, an electronic pen 600 includes a conductive part 610 in at least one portion thereof. For example, the conductive part 610, which has an annular, semi-circular, or band shape, is placed adjacent to one end of an electronic pen 600. In addition, the electronic pen 600 has a metal grip 630 at the other end thereof. The conductive part 610 and the grip 630 are connected to each other through an interconnection wire 620 inside the electronic pen 600. According to various embodiments of the present invention, when a user holds the grip 630 with a hand, a current flowing from the user's hand is transferred to the conductive part 610 through the grip 630 and the interconnection wire 620.

When the electronic pen 600 moves or rotates while being inserted into the pen storage unit of the electronic pen, the pen storage unit of the electronic device determines the movement state, moved location, rotation state, or rotated location of the electronic pen 600 through the current flowing in the conductive part 610.

Referring to FIG. 7, a conductive part 710 having an annular, semi-circular, or band shape is placed adjacent to one end of an electronic pen 700. The conductive part 710 may be implemented by a metallic material having a large capacitance. Accordingly, when a user holds a grip 720 of the electronic pen 700 with a hand, even though a current flowing from the user's hand does not transferred to the conductive part 710, the electronic device detects the movement of the electronic pen 700.

Hereinafter, a method of detecting movement of an electronic pen according to various embodiments of the present invention is described as follows with reference to FIGS. 8 to 10.

Figure 8:
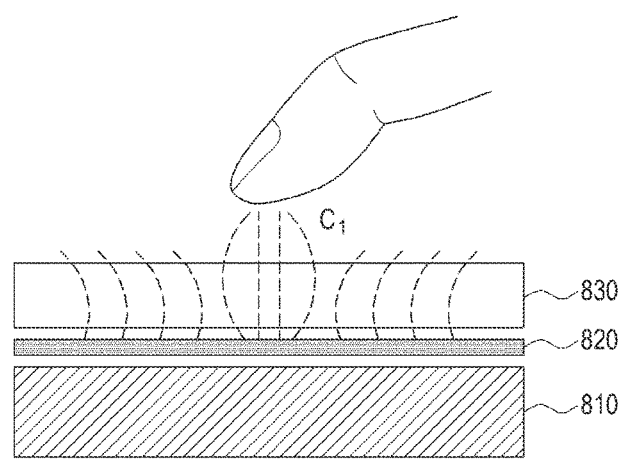
FIG. 8 is a diagram illustrating the principle of a touch screen panel according to an embodiment of the present invention.

FIG. 8 is a diagram illustrating a principle of a touch screen panel according to an embodiment of the present invention.

Referring to FIG. 8, a Touch Screen Panel (TSP) includes a display 810 (e.g., as a Liquid Crystal Display (LCD) or an Active-Matrix Organic Light-Emitting Diode (AMOLED)), a sensor array 820, and a glass 830. The display 810 displays a screen.

When an object having a high capacitance value (e.g., a hand of a user's body) is closely located within a predetermined distance from the sensor array 820 of the TSP, the quantity of electric charge generated by the sensor array 820 is varied by the hand, and an input may be detected by sensing the change in electrostatic capacity.

Figure 9:
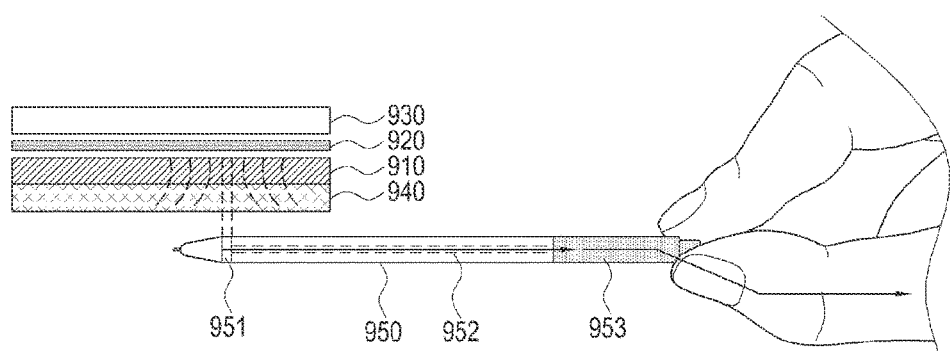
FIG. 9 is a diagram illustrating a principle of recognizing the location of an electronic pen according to various embodiments of the present invention.

FIG. 9 is a diagram illustrating a principle of recognition of a location of an electronic pen according to various embodiments of the present invention.

Referring to FIG. 9, a Touch Screen Panel (TSP) includes a display 910 (e.g., a Liquid Crystal Display (LCD) or an Active-Matrix Organic Light-Emitting Diode (AMOLED)), a sensor array 920, and a glass 930. The TSP may also include a flexible TSP. In addition, a housing 940 may be selectively placed below at least one portion of the display 910. For example, the housing 940 may also include at least a portion of a pen storage unit located below the display 910. The housing 940 may also include the sensor array 920 or an additional sensor array, using characteristics of a flexible TSP.

When an electronic pen 950 is located below the touch screen panel, the sensor array 920 or the housing 940 recognizes the quantity of electrostatic current generated by the electronic pen 950 in order to identify the current location, the moved location, and rotation or non-rotation of the electronic pen 930, or identify whether a button of the electronic pen is pressed. For example, the current transferred from the hand grasping a grip 953 of the electronic pen 950 is carried to a conductive part 951 through an interconnection wire 952 inside the electronic pen 950. The sensor array 920 or the housing 940 of the touch screen panel detects the electrostatic current generated below the touch screen panel to identify the current location, the moved location, and rotation or non-rotation of the electronic pen 950 or identify whether a button of the electronic pen is pressed.

Figure 10:
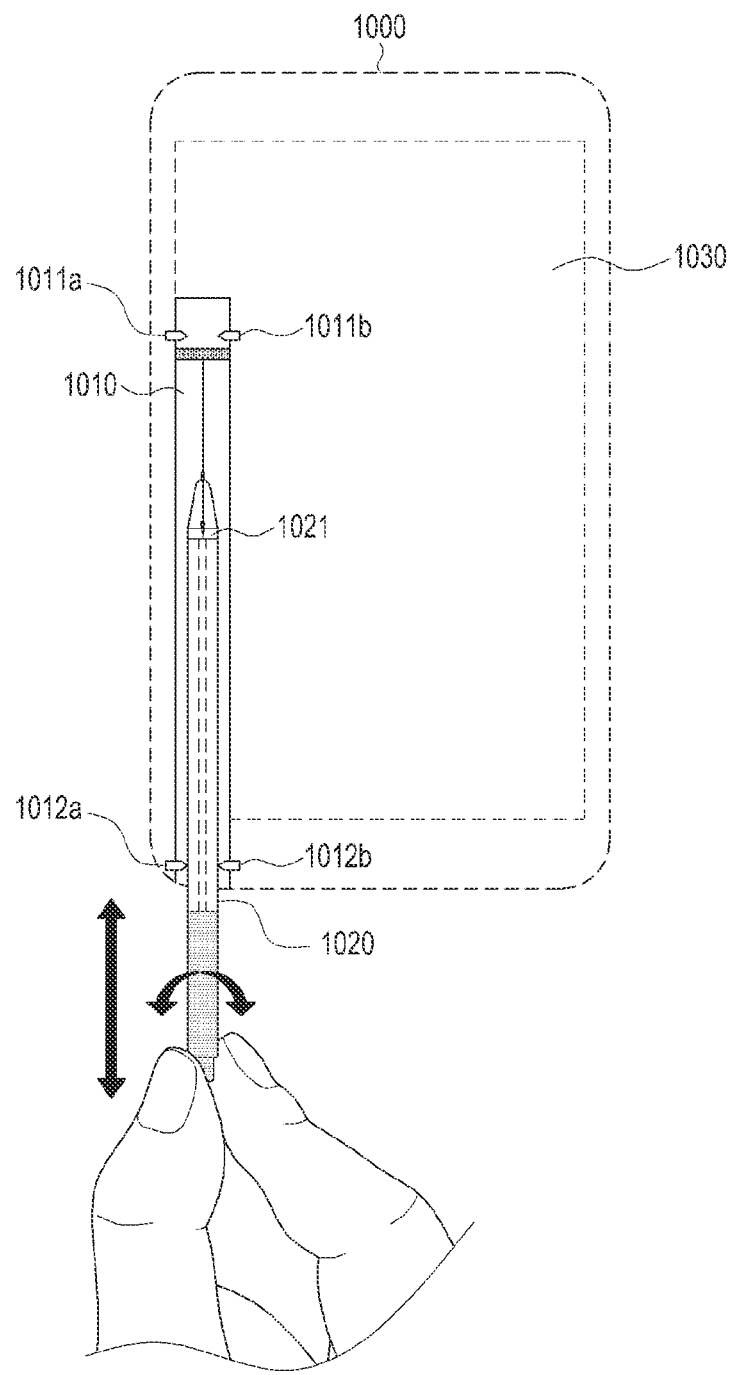
FIG. 10 is a diagram illustrating attachment/detachment of an electronic pen to/from an electronic device according to various embodiments of the present invention.

FIG. 10 is a diagram illustrating attachment/detachment of an electronic pen to/from an electronic device according to various embodiments of the present invention. Using the principle described with reference to FIG. 9, the movement or location of an electronic pen may be detected by a touch screen pad of the electronic device.

Referring to FIG. 10, in the state in which an electronic pen 1020 is completely inserted into a pen storage unit 1010 of an electronic device 1000, when a user separates the electronic pen 1020 from the pen storage unit 1010 while holding the lower end of the electronic pen 1020 with a hand, at least one of first detection switches 1011*a* and 1011*b* disposed at one end of the pen storage unit 1010 detects that the electronic pen 1020 starts to be detached from the pen storage unit 1010. When the detachment of the electronic pen 1020 is detected, a touch screen panel 1030 disposed above the pen storage unit 1010 detects the motion (e.g., movement or rotation) of the electronic pen 1020 by sensing the change in electrostatic capacity below the touch screen panel 1030.

For example, the touch screen panel 1030 detects the movement of a conductive part 1021 included in the electronic pen 1020, thereby detecting the motion of the electronic pen 1020. While continuing to detect the movement of the conductive part 1021, if the touch screen panel 1030 detects the conductive part 1021 at a lower boundary of the electronic device and thereafter no longer detects the conductive part 1021, the electronic pen 1020 is regarded as being completely separated from the pen storage unit 1010.

According to various embodiments of the present invention, when the change in electrostatic capacity is detected through the lower portion of the touch screen panel 1030 from the lower boundary of the pen storage unit 1010 while the electronic pen 1020 is completely separated, the electronic pen 1020 is regarded as starting to be inserted into the pen storage unit 1010. The touch screen panel 1030 performs an operation configured in advance in the electronic device 1000 by detecting the movement of the conductive part 1021 included in the electronic pen 1020.

According to various embodiments of the present invention, as illustrated in FIG. 10, at least one of second switches 1012*a* and 1012*b* of the electronic device 1000 are placed at the entrance of the pen storage unit 1010 to detect that the electronic pen 1020 is completely separated from the pen storage unit 1010. In addition, according to various embodiments of the present invention, at least one of the second detection switches 1012*a* and 1012*b* also detects that the insertion of the electronic pen 1020 into the pen storage unit 1010 is initiated.

According to various embodiments of the present invention, upon detecting that the electronic pen 1020 starts to be separated from or inserted into the pen storage unit 1010, it is also possible to distinguish whether the input due to the conductive part 1021 of the electronic pen 1020 is detected above or below the touch screen panel 1030. For example, if the electronic pen 1020 is inserted into the pen storage unit 1010, it may be determined that the input due to the conductive part 1021 is detected below the touch screen panel 1030, and if the electronic pen 1020 is completely separated from the pen storage unit 1010, it may be determined that the input due to the conductive part 1021 is detected above the touch screen panel 1030.

According to various embodiments of the present invention, the electronic device 1000 may additionally include a touch panel distinct from the touch screen panel 1030 to detect the movement of the electronic pen 1020. For example, a touch panel, which is distinct from the touch screen panel 1030 disposed above the pen storage unit 1010, may be additionally placed on one surface (e.g., the top, bottom, or side surface) of the pen storage unit 1010 to detect the movement of the electronic pen 1020. For example, when the electronic pen 1020 moves inside the pen storage unit 1010, the touch panel additionally provided on one surface of the pen storage unit 1010 may detect the movement of the electronic pen 1020.

Figure 11:
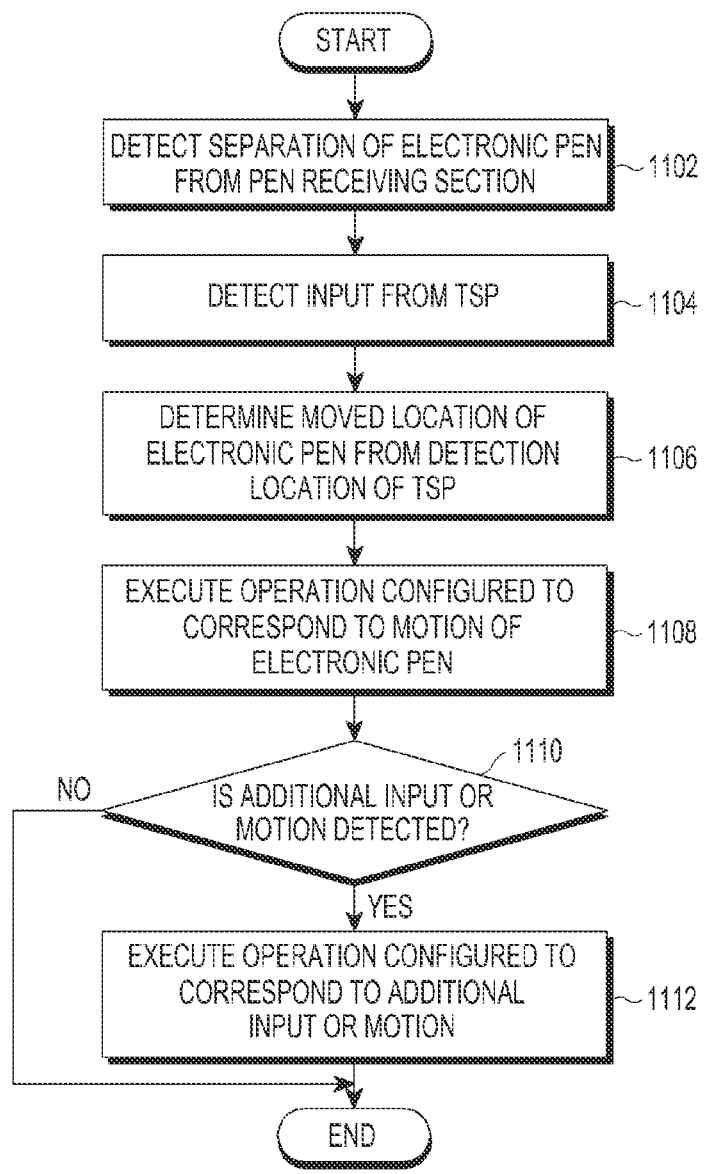
FIG. 11 is a flowchart illustrating a procedure of operating an electronic device by determining the movement of an electronic pen according to various embodiments of the present invention.

FIG. 11 is a flowchart illustrating a procedure of operating an electronic device by determining the movement of an electronic pen according to various embodiments of the present invention.

Referring to FIG. 11, in step 1102, separation of an electronic pen from a pen storage unit is detected. In step 1104, a touch screen panel included in an electronic device detects a change in electrostatic capacity therebelow as the separation of the electronic pen is detected.

In step 1106, the motion of the electronic pen is determined from the detected location below the touch screen panel.

In step 1108, an operation configured to correspond to information related to the motion of the electronic pen is performed as the motion of the electronic pen is determined.

When an additional input from the electronic pen (e.g., an input of a button included in the pen), another input of the electronic device (e.g., a screen touch or voice recognition), or an additional motion of the electronic pen (e.g., movement or rotation) is detected in step 1110, an operation configured to correspond to the additional input or the motion of the electronic pen is performed, in step 1112. Performance of the operation configured to correspond to the input by the electronic pen or the movement of the electronic pen according to various embodiments of the present invention is described below with reference to the accompanying drawings.

At least one of the operations illustrated in FIG. 11 may be omitted, or at least one other operation may be added between the operations, in accordance with embodiments of the present invention. In addition, the operations described with reference to FIG. 11 may be sequentially processed as illustrated in FIG. 11, and the execution sequences of at least one operation and another operation may be switched.

Hereinafter, methods of detecting the motion (e.g., movement or rotation) of an electronic pen according to various embodiments of the present disclosure will be described with reference to FIGS. 12 to 20. According to various embodiments of the present invention, additional sensors or devices may be added to accurately detect a motion of an electronic pen.

Figure 12:
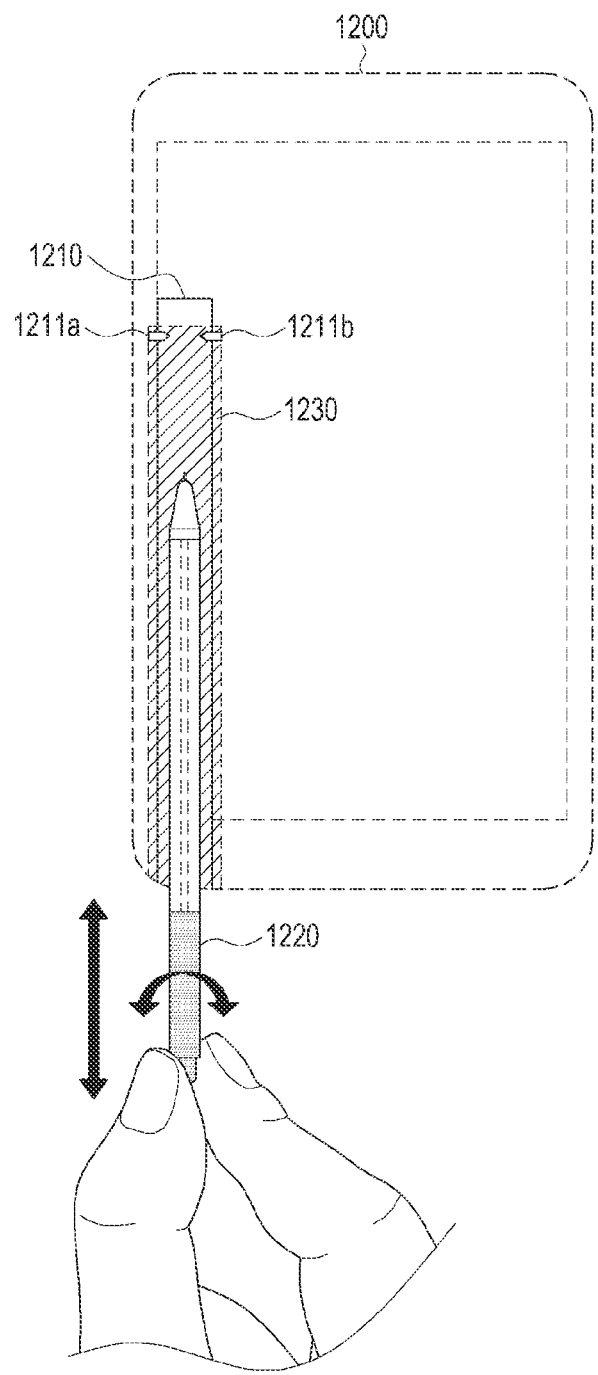
FIG. 12 is a diagram illustrating an electronic device having a touch panel added thereto to recognize an electronic pen according to various embodiments of the present invention.

FIG. 12 is a diagram illustrating an electronic device having a touch panel added thereto to recognize an electronic pen according to various embodiments of the present invention.

Referring to FIG. 12, an electronic device 1200 includes a separate touch panel 1230 that is additionally attached to at least one side surface of a pen storage unit 1210 capable of receiving an electronic pen 1220 or at least one side surface of the electronic device 1200. For example, the touch panel 1230 for detecting a motion of the electronic pen 1220, which is distinct from a touch screen panel provided on the front surface of the electronic device 1200, may be additionally attached to at least one surface of the pen storage unit 1210 or the electronic device 1200.

According to various embodiments of the present invention, when a user pulls the electronic pen 1220, while it is received in the pen storage unit 1210, with a hand so that the electronic pen 1220 starts to be separated from the pen storage unit 1210, at least one of detection switches 1211a and 1211b detects that the separation of the electronic pen 1220 is initiated, and the touch panel 1230 provided on at least one surface of the pen storage unit 1210 or the electronic device 1200 detects the motion of the electronic pen 1220. In this case, the touch screen panel provided on the front surface of the electronic device 1200 may ignore the signal detected from the electronic pen 1220.

According to various embodiments of the present invention, upon determining that the electronic pen 1220 is completely separated from the pen storage unit 1210, the touch panel 1230 provided on at least one surface of the pen storage unit 1210 or the electronic device 1200 stops the operation thereof, and the signal detected by the electronic pen 1220 is processed as an input on the touch screen panel provided on the front surface of the electronic device 1200.

According to various embodiments of the present invention, when the touch screen panel corresponds to a flexible panel, the electronic device 1200 may not include a separate touch panel for detecting the motion of the electronic pen 1220, and the touch panel provided on the front surface of the electronic device 1200 may be bent to extend to the pen storage unit 1210, thereby making it possible to recognize a touch on the front surface of the electronic device 1200 and detect the motion of the electronic pen 1220 at the same time.

For example, a touch on a touch region located above the pen storage unit 1210 among the entire region of one touch panel may be processed as a touch on the front surface of the electronic device 1200, and a touch on a touch region located on at least one side surface of the pen storage unit 1210 among the entire region may be processed as an input for detecting the motion of the electronic pen 1220.

According to various embodiments of the present invention, a sensor may be provided that can measure a magnetic field in the region where the detection switch 1211a and 1211b is located, while shielding the pen storage unit 1210. When the electronic pen 1220 starts to move while being completely received in the pen storage unit 1210, the sensor capable of measuring the magnetic field may operate to detect the movement of the electronic pen 1220. When the magnetic field of the electronic pen 1220 is not measured, the sensor may determine that the electronic pen 1220 is completely separated from the pen storage unit 1210.

Figure 13:
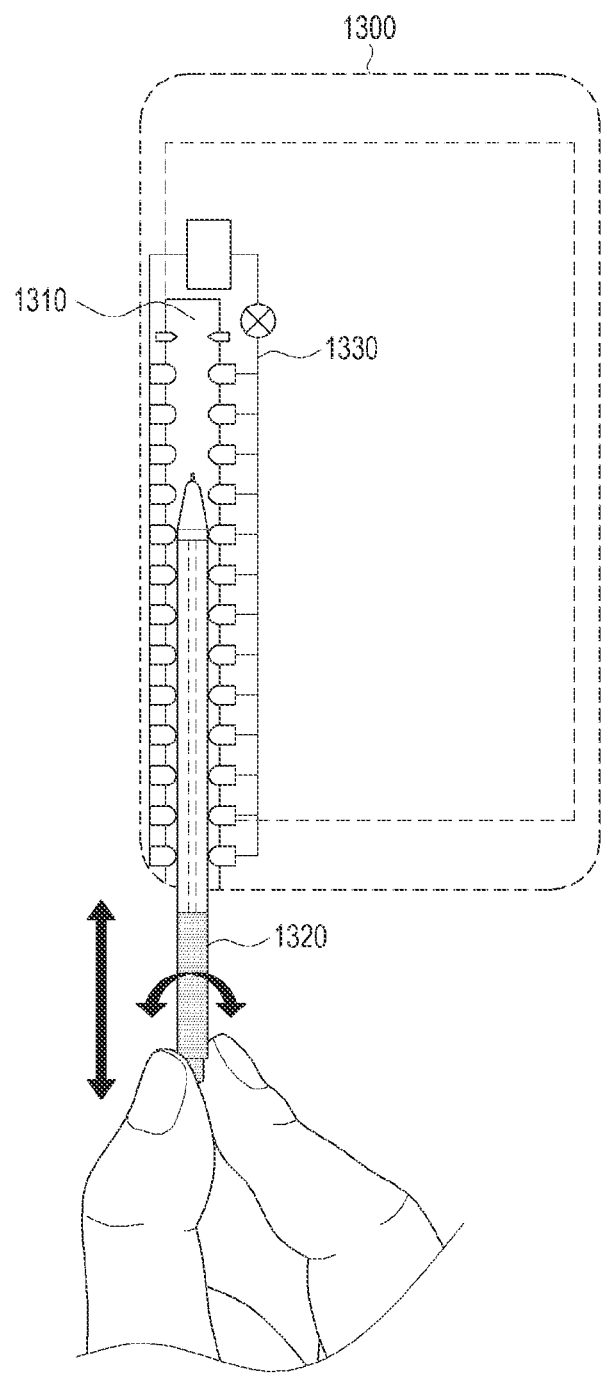
FIG. 13 is a diagram illustrating an electronic device for recognizing an electronic pen using a switch array according to various embodiments of the present invention.
Figure 14:
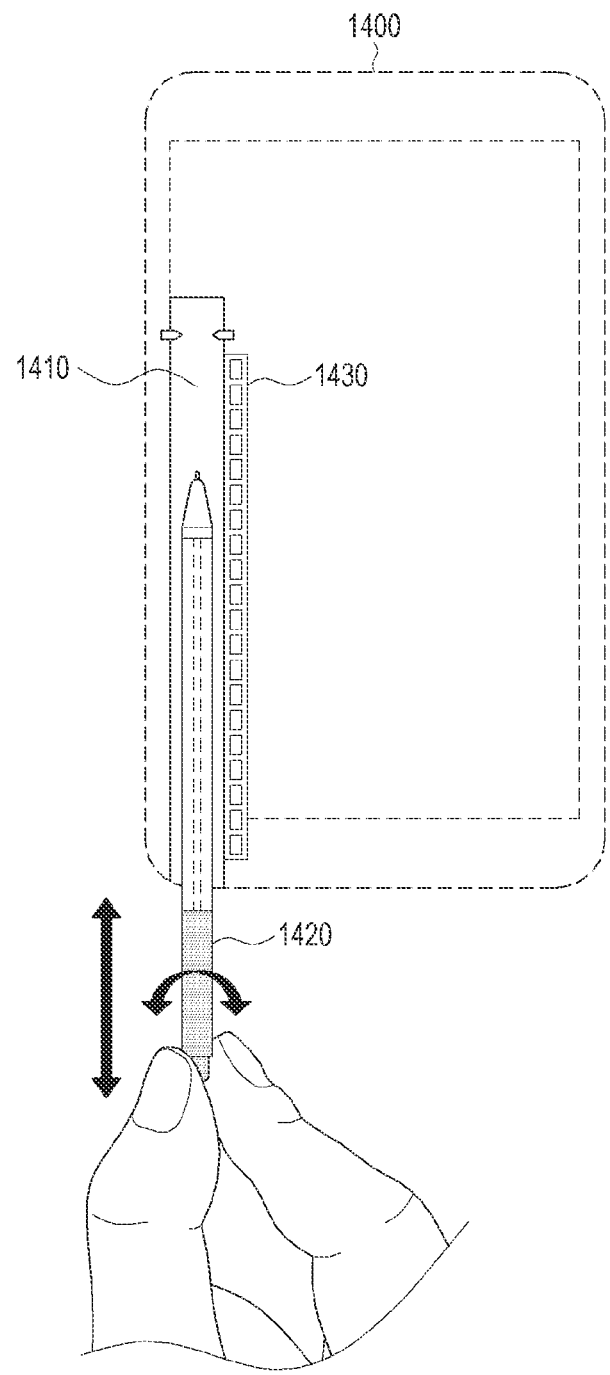
FIG. 14 is a diagram illustrating an electronic device for recognizing an electronic pen using a Hall sensor array according to various embodiments of the present invention.

FIGS. 13 and 14 illustrate detection of a motion (e.g., movement or rotation) of an electronic pen in different ways without using a touch panel according to embodiments of the present invention.

FIG. 13 is a diagram illustrating an electronic device for recognizing an electronic pen using a switch array according to various embodiments of the present invention.

Referring to FIG. 13, an electronic device 1300 includes a circuit 1330 placed inside a pen storage unit 1310 for receiving an electronic pen 1320 to detect the motion of the electronic pen 1320, the circuit 1330 having electric contact switches that are arranged at a predetermined interval to contact a conductive part included in an electronic pen 1320.

FIG. 14 is a diagram illustrating an electronic device for recognizing an electronic pen using a Hall sensor array according to various embodiments of the present invention.

Referring to FIG. 14, an electronic device 1400 includes Hall sensors 1430, which are arranged at a predetermined interval inside a pen storage unit 1410 for receiving an electronic pen 1420 and respond to a magnetic field. The electronic pen 1420 may include a magnetic body at a location a conductive part is placed, and the Hall sensors 1430 may sense the magnetic body as the electronic pen 1420 moves, thereby detecting the motion of the electronic pen.

Figure 15A:
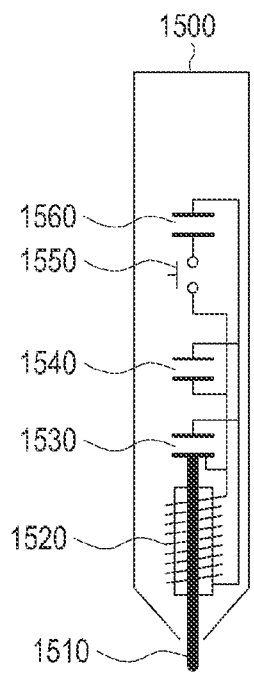
FIG. 15A is a diagram illustrating an internal structure of an electronic pen according to various embodiments of the present invention.

FIG. 15A is a diagram illustrating an internal structure of an electronic pen according to various embodiments of the present invention. A sensor (e.g., touch panel) of an electronic device may detect a change in impedance (i.e., a Z value) using an inductance value of an LC circuit included in an electronic pen 1500 to identify an input by a switch included in the electronic pen 1500.

Referring to FIG. 15A, the electronic pen 1500 includes a pen tip 1510, a coil 1520, a first capacitor 1530, a second capacitor 1540, a switch 1550, and a third capacitor 1560.

The first capacitor 1530 includes a variable capacitor, and when the pen tip 1510 is pressed against a touch panel, the C value of the first capacitor 1530 may be varied depending upon the pressure that the pen tip 1510 exerts on the touch panel.

When a user presses the button included in the electronic pen 1500, the switch 1550 is closed so that the circuit is connected. Therefore, the corresponding current is induced in the coil 1520, whereby the electronic device detects an input from the electronic pen 1500.

According to various embodiments of the present invention, instead of the button, a switch that is connected according to rotation of the electronic pen may be connected to the switch 1550 connected to the third capacitor 1560, and therefore, the circuit may detect rotation of the electronic pen.

Figure 15B:
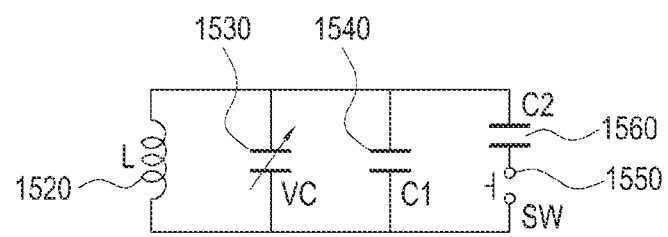
FIG. 15B is a diagram illustrating a circuit of an electronic pen according to various embodiments of the present invention.

FIG. 15B is a diagram illustrating a circuit equivalent to the internal structure of the electronic pen of FIG. 15A. When a variable coil instead of the third capacitor 1560 is connected to the equivalent circuit of FIG. 15B, the entire inductance value is changed so that the electronic device detects an input by the electronic pen.

Figure 16:
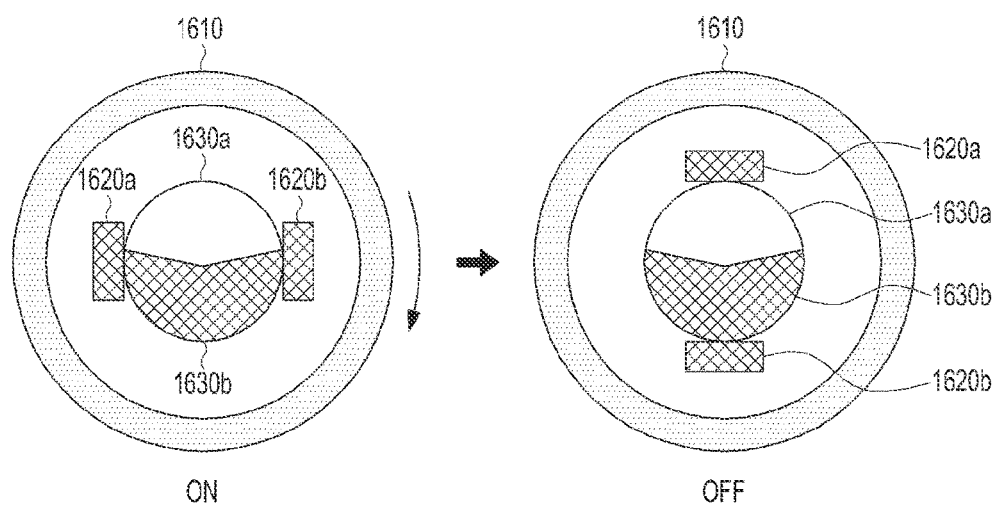
FIG. 16 is a sectional view illustrating a structure for detecting rotation of an electronic pen according to various embodiments of the present invention.

FIG. 16 is a sectional view illustrating a structure for detecting rotation of an electronic pen according to various embodiments of the present invention.

Referring to FIG. 16, the opening/closing of the switch illustrated in FIG. 15A may be controlled by rotating a grip 1610 of an electronic pen.

For example, when the grip 1610 of the electronic pen is rotated, first and second contact points 1620a and 1620b are rotated together with the grip 1610. Accordingly, the contact points 1620a and 1620b may contact an insulator 1630a or a conductor 1630b, whereby the opening/closing of the switch may be controlled. For example, when both the first and second contact points 1620a and 1620b contact the conductor 1630b, the switch is in the On state. When a user rotates the grip 1610, the contact points 1620a and 1620b are accordingly rotated so that the first contact point 1620a contacts the insulator 1630a and the second contact point 1620b contacts the conductor 1630b, whereby the switch is in the Off state.

Figure 17:
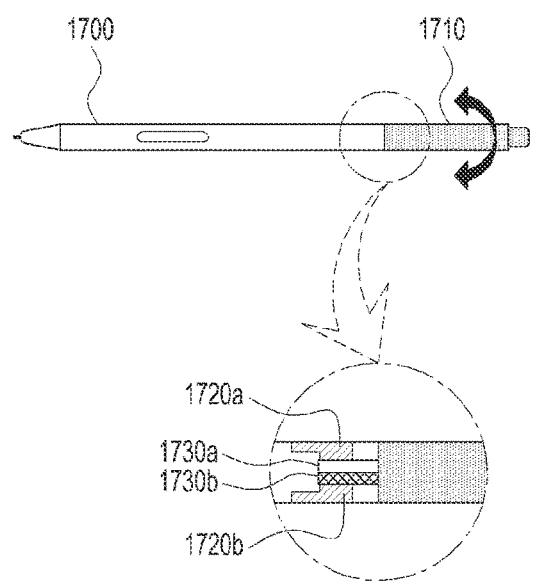
FIG. 17 is a diagram illustrating a structure for detecting rotation of an electronic pen according to various embodiments of the present invention.

FIG. 17 is a diagram illustrating a structure for detecting rotation of an electronic pen according to various embodiments of the present invention.

Referring to FIG. 17, a switch may be turned on or off by rotating a rotatable grip 1710 of an electronic pen 1700, using the principle described with reference to FIG. 16. For example, the switch may be turned on or off according to a state in which first and second contact points 1720a and 1720b contact an insulator 1730a or a conductor 1730b. Using the method, it is possible to detect rotation of an electronic pen according to various embodiments of the present invention. For example, rotation or non-rotation, a rotation direction, a rotation speed, a rotation angle, and a rotation pattern of an electronic pen may be determined using the detected information.

Figure 18:
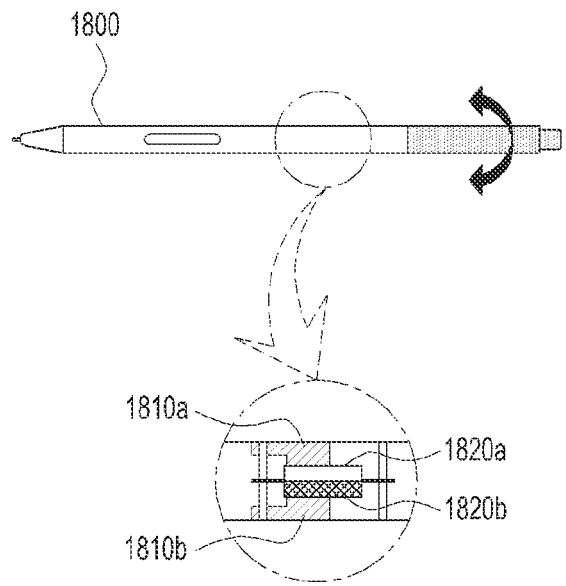
FIG. 18 is a diagram illustrating a structure for detecting rotation of an electronic pen according to various embodiments of the present invention.

FIG. 18 is a diagram illustrating a structure for detecting rotation of an electronic pen according to various embodiments of the present invention.

Referring to FIG. 18, when an electronic pen 1800 is rotated, the rotation of the electronic pen 1800 is detected according to an asymmetric rotating weight inside the electronic pen.

For example, the asymmetric rotating weight inside the electronic pen includes an insulator 1820a and a conductor 1820b. Since the conductor 1820b of a metallic material is heavier than the insulator 1820a, the conductor 1820b always orients downwards when the electronic pen is rotated. Therefore, when the electronic pen is rotated, a switch is turned on or off according to the state in which first and second contact points 1810a and 1810b contact the insulator 1820a or the conductor 1820b.

According to various embodiments of the present invention, the rotation angle or rotational movement of the electronic pen may also be detected by adjusting the number and/or location of contact points 1810a and 1810b or the width of the conductor 1820b of the asymmetric rotating weight.

According to various embodiments of the present invention, the asymmetric rotating weight may be implemented in various shapes such a spherical shape as well as a cylindrical shape. For example, the asymmetric rotating weight may have a variety of shapes, whereby the rotational movement of the electronic pen can be detected in various directions.

Using the method, it is possible to detect the rotation of the electronic pen according to various embodiments of the present invention. For example, rotation or non-rotation, a rotation direction, a rotation speed, a rotation angle, and a rotation pattern of an electronic pen may be determined using the detected information.

Figure 19:
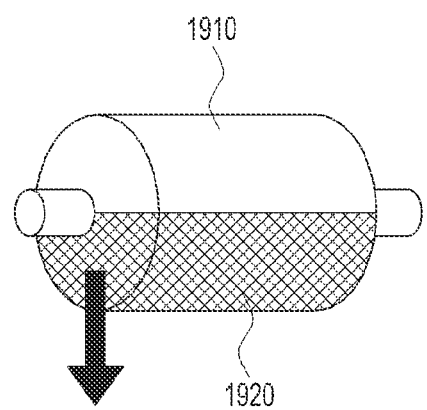
FIG. 19 is a diagram illustrating an asymmetric rotating weight for detecting rotation of an electronic pen according to various embodiments of the present invention.

FIG. 19 is a diagram illustrating an asymmetric rotating weight for detecting rotation of an electronic pen according to various embodiments of the present invention.

Referring to FIG. 19, since a conductor 1920 of a metallic material is heavier than an insulator 1910 as described in FIG. 18, when an electronic pen is rotated, the conductor 1920 always orients downwards.

Figure 20:
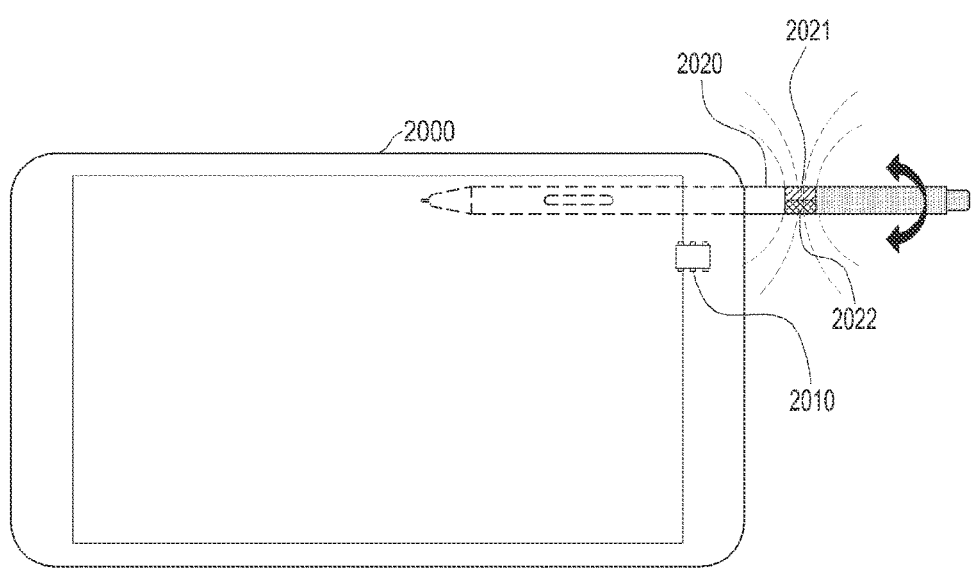
FIG. 20 is a diagram illustrating a structure for detecting rotation of an electronic pen according to various embodiments of the present invention.

FIG. 20 is a diagram illustrating a structure for detecting rotation of an electronic pen according to various embodiments of the present invention.

Referring to FIG. 20, magnetic bodies 2021 and 2022 are fitted around an electronic pen 2020, and rotation of the electronic pen 2020 is detected according to whether the polarities of the magnetic bodies are reversed relative to the electronic device 2000.

For example, when the electronic pen 2020 inserted into an electronic device 2000 is rotated as illustrated in FIG. 20, the orientation of the magnetic field generated by the South and North poles 2021 and 2022 of magnetic body secured to the electronic pen 2020 is varied. A magnetic sensor 2010 (e.g., a sensor using a magnetic head, a current trance, a tachometer generator, a Hall device, and a Magnetic Resistance Element (MRE)) embedded in the electronic device 2000 detects the rotation of the electronic pen 2020 by sensing the orientation of the magnetic field varied depending upon the rotation of the electronic pen 2020. In addition, according to various embodiments of the present invention, the rotation of the electronic pen 2020 may be detected through the magnetic sensor 2010, thereby providing a function of distinguishing the rotation or non-rotation, the rotation direction, the rotation speed, the rotation angle, and the rotation pattern of the electronic pen 2020 as well as a function of turning on or off the switch. For example, the magnetic sensor may detect the change in magnetic flux measured according to the rotation angle to obtain various pieces of information associated with the rotation of the electronic pen 2020.

According to various embodiments of the present invention, magnetic bodies and a magnetic sensor may also be included in the electronic device and the electronic pen, respectively.

When the motion (e.g., movement or rotation) of the electronic pen inserted into the electronic device is detected as described above, various user interfaces which will be described below may be provided using the detected information.

Hereinafter, examples of a user interface that is provided according to a motion (e.g., movement or rotation) of an electronic pen according to various embodiments of the present invention are described with reference to FIGS. 21 to 31.

Figure 21:
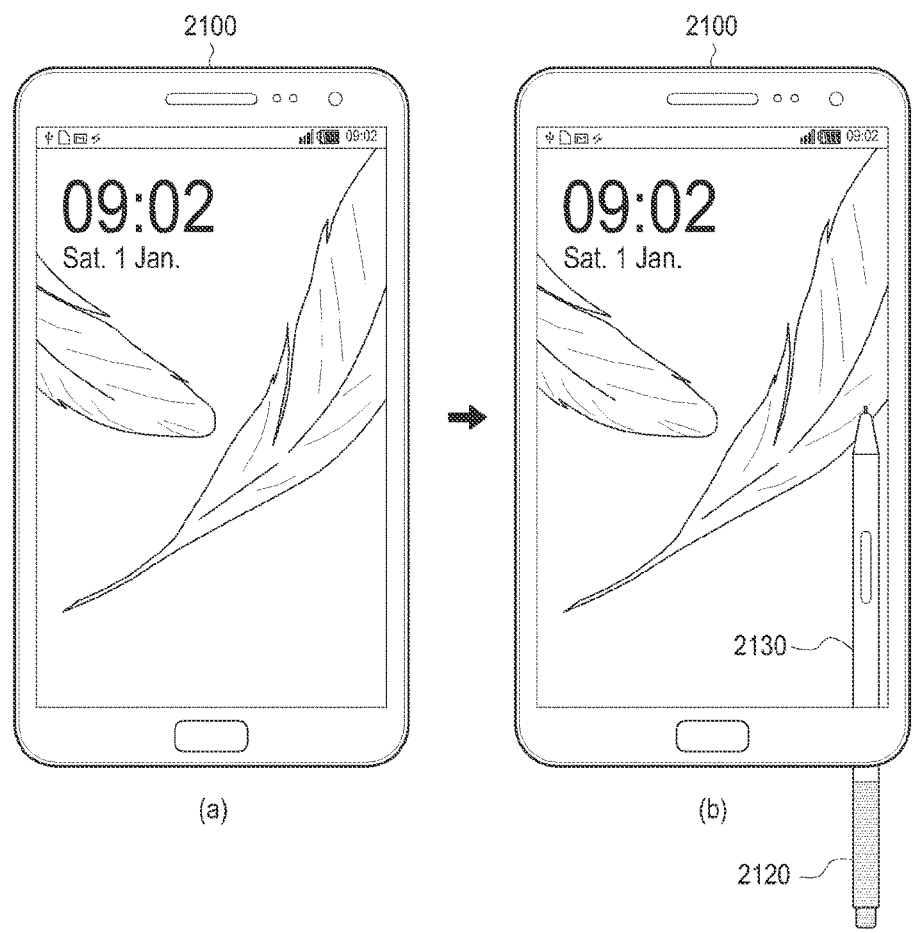
FIG. 21 is a diagram illustrating an example of displaying, on a screen, a motion of an electronic pen according to various embodiments of the present invention.

FIG. 21 is a diagram illustrating an example of displaying, on a screen, a motion (e.g., movement or rotation) of an electronic pen according to various embodiments of the present invention.

Referring to FIG. 21 (*a*), when an electronic pen 2120 starts to be detached from a pen storage unit of the electronic device 2100, the location of the electronic pen 2120 is identified, and a virtual electronic pen 2130 is displayed on a screen as illustrated in FIG. 21 (*b*). For example, when a user separates the electronic pen 2120 from the pen storage unit with a hand while a screen is displayed as illustrated in FIG. 21 (*a*), an image of the electronic pen 2120 is displayed on the screen as illustrated in FIG. 21 (*b*), whereby the location the electronic pen 2120 is inserted may be identified.

Figure 22:
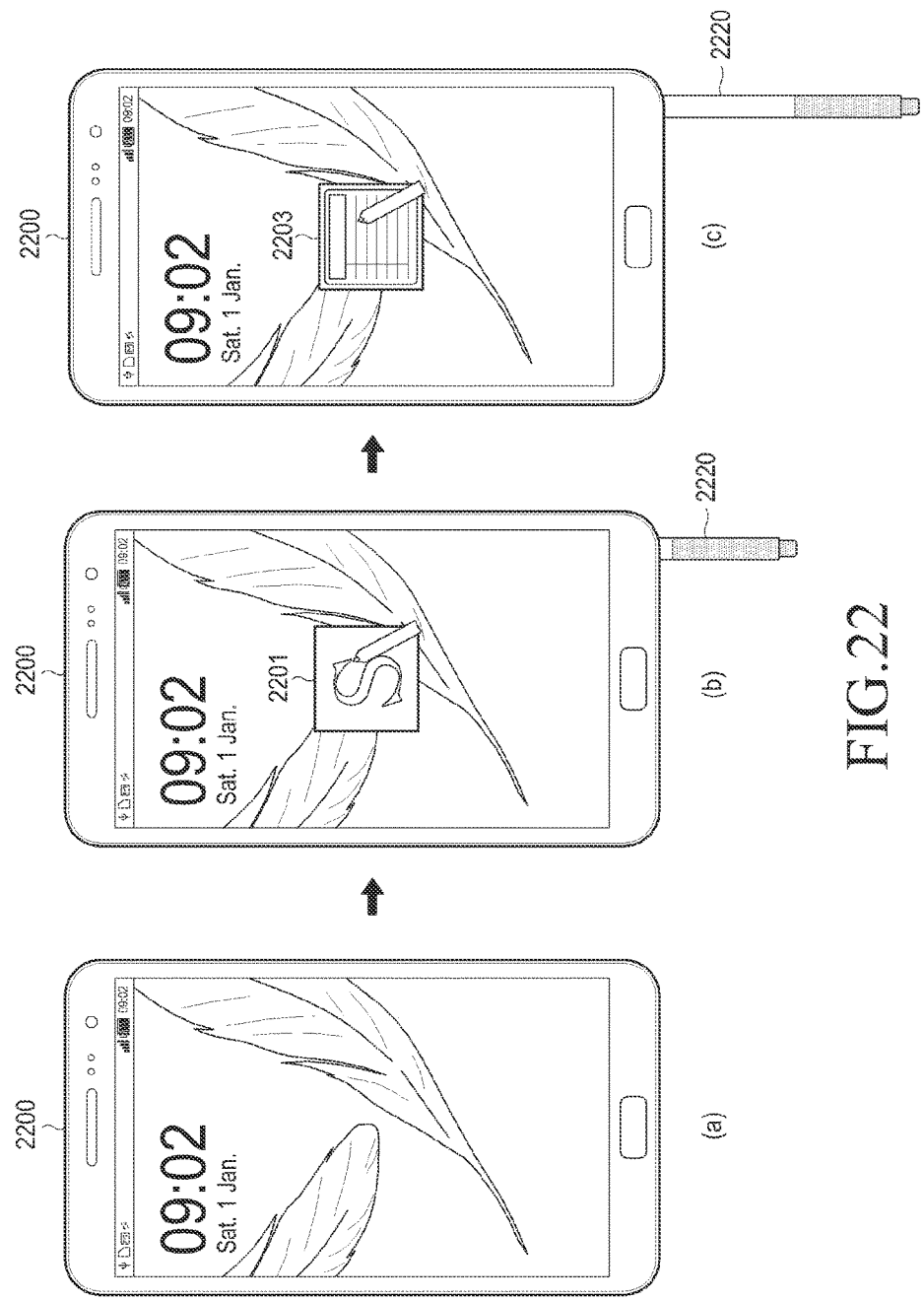
FIG. 22 is a diagram illustrating an example of displaying an application corresponding to a motion of an electronic pen according to various embodiments of the present invention.

FIG. 22 is a diagram illustrating an example of displaying an application corresponding to a motion of an electronic pen according to various embodiments of the present invention.

Referring to FIG. 22, with movement of an electronic pen 2220, a short cut icon of an application corresponding to each location of the electronic pen 2220 is displayed on a screen.

For example, as illustrated in FIG. 22 (*a*), a standby screen is displayed while the electronic pen 2220 is completely inserted into a pen storage unit of the electronic device 2200. According to another embodiment of the present invention, when the electronic pen 2220 is completely inserted into the pen storage unit while the screen is in the Off state, the screen is maintained in the Off state, and when a user starts to separate the electronic pen 2220 so that the detachment of the electronic pen 2220 is initiated, the standby screen may be displayed.

Referring to FIG. 22 (*b*), when the user starts to separate the electronic pen 2220 so that the electronic pen 2220 reaches a first location, a shortcut icon 2201 of a note application is displayed on the screen. When the user continues to separate the electronic pen 2220 so that the electronic pen 2220 reaches a second location, a shortcut icon 2203 of a schedule management application may be displayed on the screen, as illustrated in FIG. 22 (*c*).

According to various embodiments of the present invention, the user may configure an application corresponding to a location of the electronic pen 2220, and the corresponding application may be executed through a movement distance and a movement pattern (e.g., a pattern in which the electronic pen 2220 repeatedly moves in the predetermined range) of the electronic pen 2220.

When the user enters an additional input while the short cut icon of each application is displayed, the corresponding displayed application may be executed. For example, the user may touch the screen or press a button of the electronic pen 2220 while the shortcut icon of a particular application is displayed on the screen, thereby executing the application or configuring the mode of the corresponding application. For example, while a note application is displayed (or selected) by moving the electronic pen 2220 inside the pen storage unit by the user, when a button of the electronic pen 2220 is pressed, a menu may be displayed, on the screen, through which a detailed function, such as a note writing function or a note view function, may be selected.

According to various embodiments of the present invention, when a part (e.g., the grip) of the electronic pen 2220 is rotated, the electronic device 2200 detects the rotation of the electronic pen 2220, or the electronic pen 2220 generates a particular signal, in response to which an application is executed.

According to various embodiments of the present invention, while a particular application is selected by moving the electronic pen 2220 inside the pen storage unit by a predetermined distance, when the electronic pen 2220 is moved again after a predetermined amount of time passes, various functions associated with the selected application are additionally provided.

Figure 23:
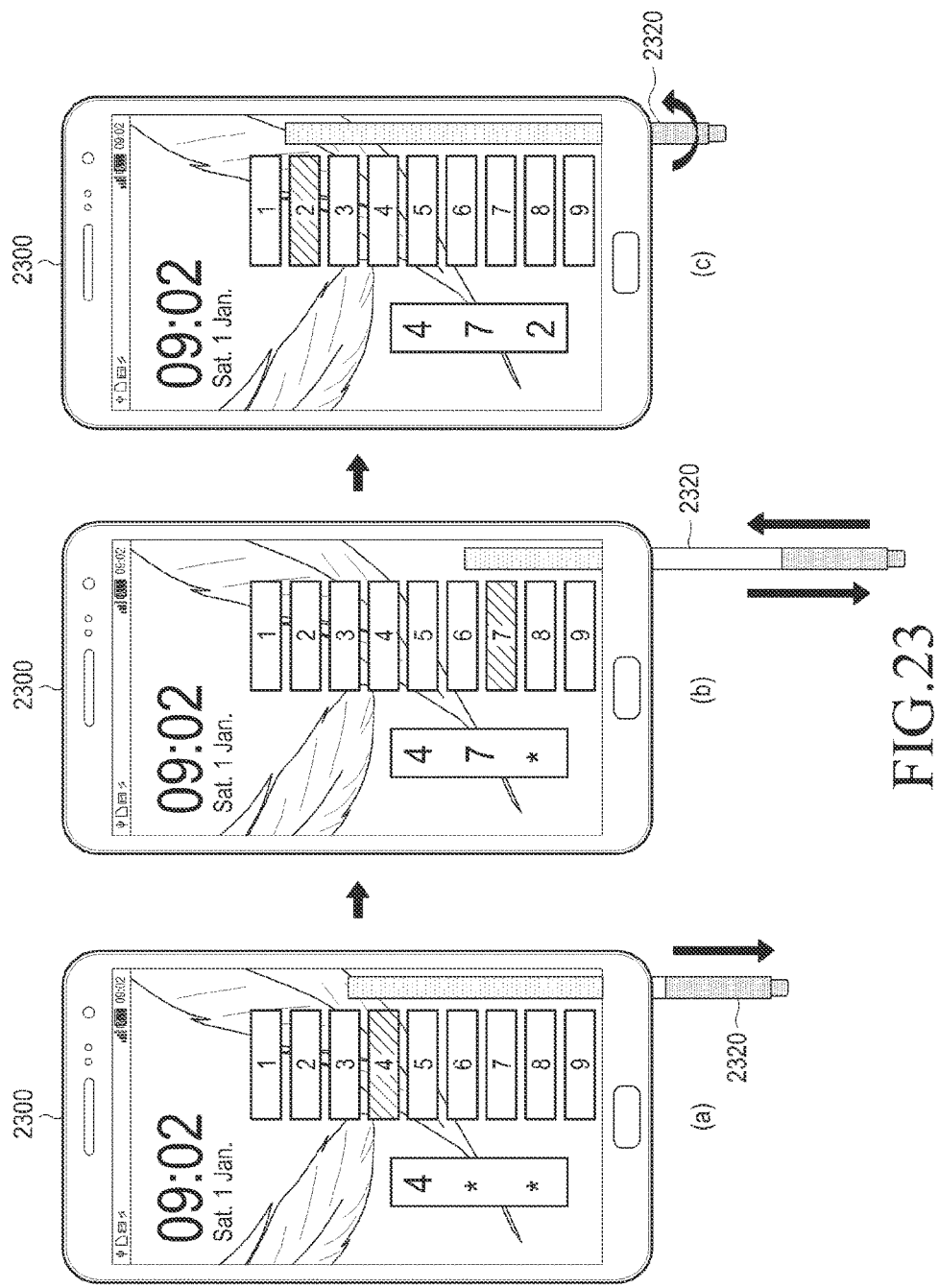
FIG. 23 is a diagram illustrating an example of inputting a password corresponding to a motion of an electronic pen according to various embodiments of the present invention.

FIG. 23 is a diagram illustrating an example of inputting a password corresponding to a motion of an electronic pen according to various embodiments of the present invention.

Referring to FIG. 23, when movement of an electronic pen 2320 is detected while an electronic device 2300 is locked, the electronic device 2300 determines that a number corresponding to the location of the electronic pen 2320 has been entered. A user may unlock the electronic device 2300 by moving the electronic pen 2320 to the location corresponding to the password.

A method of selecting a number at the corresponding location after the movement of the electronic pen 2320 may be implemented in various ways. For example, when the electronic pen 2320 is stationary for a predetermined period of time after movement, the electronic device 2300 determines that the number at the corresponding location has been entered, and when an input by another input unit (e.g., an input on a touch screen panel, rotation of the electronic pen 2320 such as shown in FIG. 23 (*c*), or a button input of the electronic pen 2320) is detected at the location the electronic pen 2320 has been moved, the electronic device 2300 that the number at the corresponding location has been entered.

According to various embodiments of the present invention, the electronic device 2300 may also be unlocked though a method of moving the electronic pen 2320 in a predetermined pattern without selecting a number. For example, the electronic device 2300 may also be unlocked by configuring a pattern, such as move electronic pen 2320 downwards→move electronic pen 2320 upwards→move electronic pen 2320 downwards→press button→move electronic pen 2320 upwards→press button.

According to various embodiments of the present invention, the electronic device 2300 may also be unlocked by configuring a pattern through a combination of one or more of a movement direction, a rotation direction, and a press of the electronic pen 2320. For example, the electronic device 2300 may also be unlocked by configuring a pattern, such as move electronic pen 2320 downwards→rotate electronic pen 2320 clockwise→move electronic pen 2320 upwards→press button→rotate electronic pen 2320 counterclockwise.

When the electronic device 2300 is unlocked by combining the pattern of the motion of the electronic pen 2320, information associated with the motion of the electronic pen 2320 may be displayed on the screen for a guide, and the unlocking operation through the pattern combination may be implemented even in the standby or off state of the screen.

Figure 24:
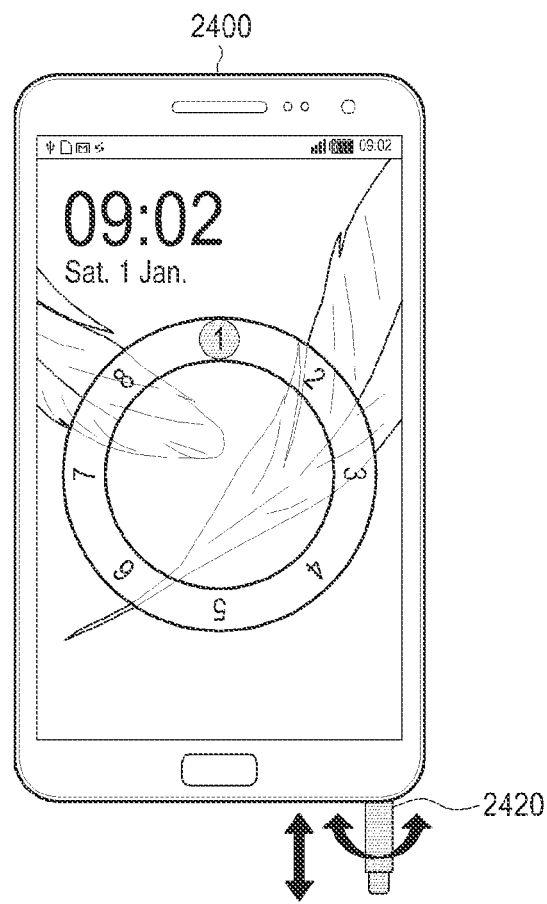
FIG. 24 is a diagram illustrating an example of inputting a password corresponding to a motion of an electronic pen according to various embodiments of the present invention.

FIG. 24 is a diagram illustrating an example of inputting a password corresponding to a motion of an electronic pen according to various embodiments of the present invention.

Referring to FIG. 24, an electronic device 2400 is unlocked by moving an electronic pen 2420 while the electronic device 2400 is locked.

For example, when a user moves the electronic pen 2420 by a predetermined distance while the electronic pen 2420 is completely inserted into the electronic device 2400, a password may be selected by using rotating numbers displayed on a screen. Methods of selecting the displayed numbers according to state in which the electronic pen 2420 has been moved may be implemented in various ways. For example, the corresponding number may be selected by stopping the electronic pen 2420 for a predetermined period of time, by pressing a button included in the electronic pen 2420, by rotating the electronic pen 2420, or by touching the screen of the electronic device 2400 in a state in which the electronic pen 2420 has been moved.

Figure 25:
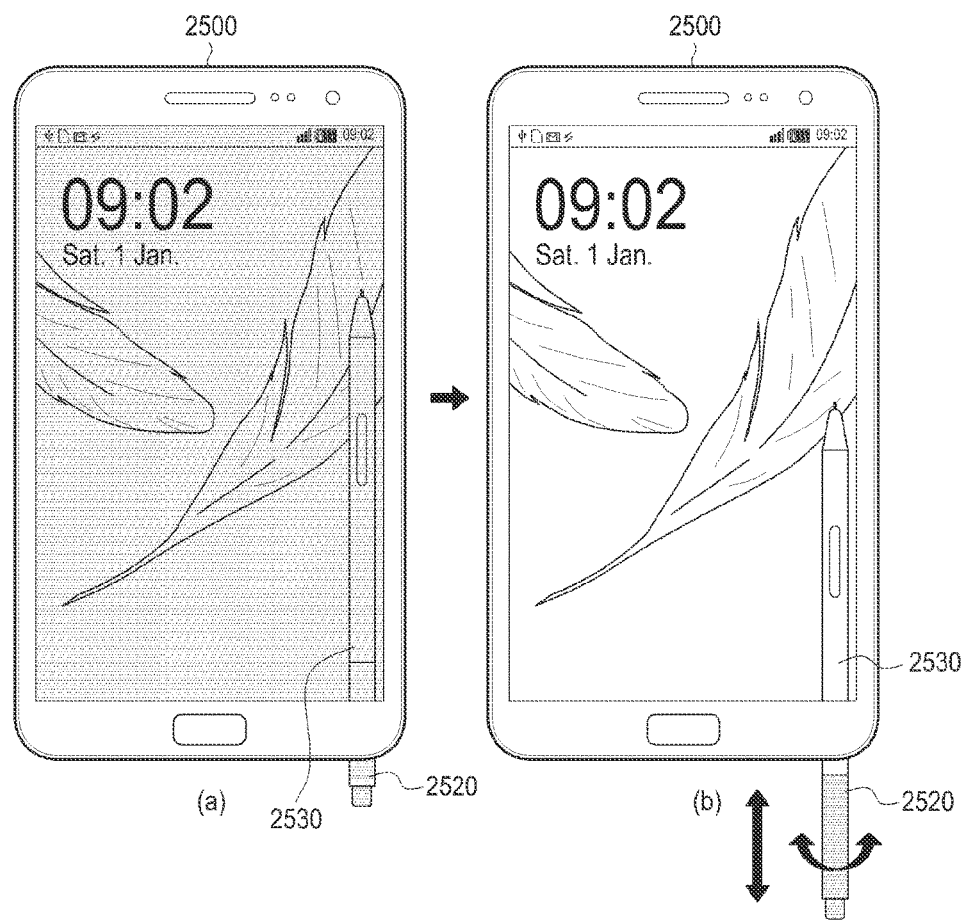
FIG. 25 is a diagram illustrating an example of adjusting settings of an electronic device depending upon a motion of an electronic pen according to various embodiments of the present invention.

FIG. 25 is a diagram illustrating an example of adjusting settings of an electronic device depending upon a motion of an electronic pen according to various embodiments of the present invention.

Referring to FIG. 25, for example, when an electronic pen 2520 starts to be detached from a pen storage unit of the electronic device 2500, various types of settings of the electronic device 2500 may be changed by identifying the location to which the electronic pen 2520 has been moved. For example, when the electronic pen 2520 starts to be detached from the pen storage unit, as shown in FIG. 25 (*a*), the screen of the electronic device 2500 is gradually brightened according to an identified location of the electronic pen 2520, as shown in FIG. 25 (*b*).

According to various embodiments of the present invention, the set volume and the screen size of the electronic device 2500, as well as the brightness, may be changed by detecting the motion of the electronic pen 2520.

For example, according to various embodiments of the present invention, when the electronic pen 2520 is moved, a setup menu of the electronic device 2500 corresponding to the location to which the electronic pen 2520 is moved is displayed. In this case, a user may change settings in the corresponding setup menu by rotating or pressing the electronic pen 2520 at a particular location. For example, when the electronic pen 2520 is moved to a first location inside the pen storage unit, a setup screen capable of adjusting volume may be displayed, and the user may adjust the volume by moving the electronic pen 2520 again, rotating the electronic pen 2520, pressing a button of the electronic pen 2520, or touching the screen of the electronic device 2500.

According to various embodiments of the present invention, when the user selects the setup menu in the electronic device 2500, a setup menu capable of changing various settings is displayed on the screen, and when a setting is selected from the setup menu, the user adjusts a setting value for the corresponding setup menu by moving the electronic pen 2520. For example, the user is able to adjust the brightness of the screen by moving the electronic pen 2520 while a brightness adjustment option is selected in an indicator bar located on an upper side of the screen of the electronic device 2500. In this case, a brightness adjustment window does not need to be separately displayed on the screen, and therefore, the screen is not be hidden by the brightness adjustment window when the brightness is adjusted.

According to various embodiments of the present invention, when various settings of the electronic device 2500 are changed as described above, a virtual electronic pen image 2530 may be displayed on a side of the screen as illustrated in FIGS. 25 (*a*) and (*b*), whereby the currently adjusted setting value or step may be displayed. For example, the current setting value or step may be displayed as a number or image adjacent to the virtual electronic pen image 2530.

FIGS. 26 to 30 illustrate examples of controlling an input of an application executed by a motion of an electronic pen according to various embodiments of the present invention.

Referring to FIGS. 26 to 30, a function of detecting movement of an electronic pen may be used for various types of games and content.

Figure 26:
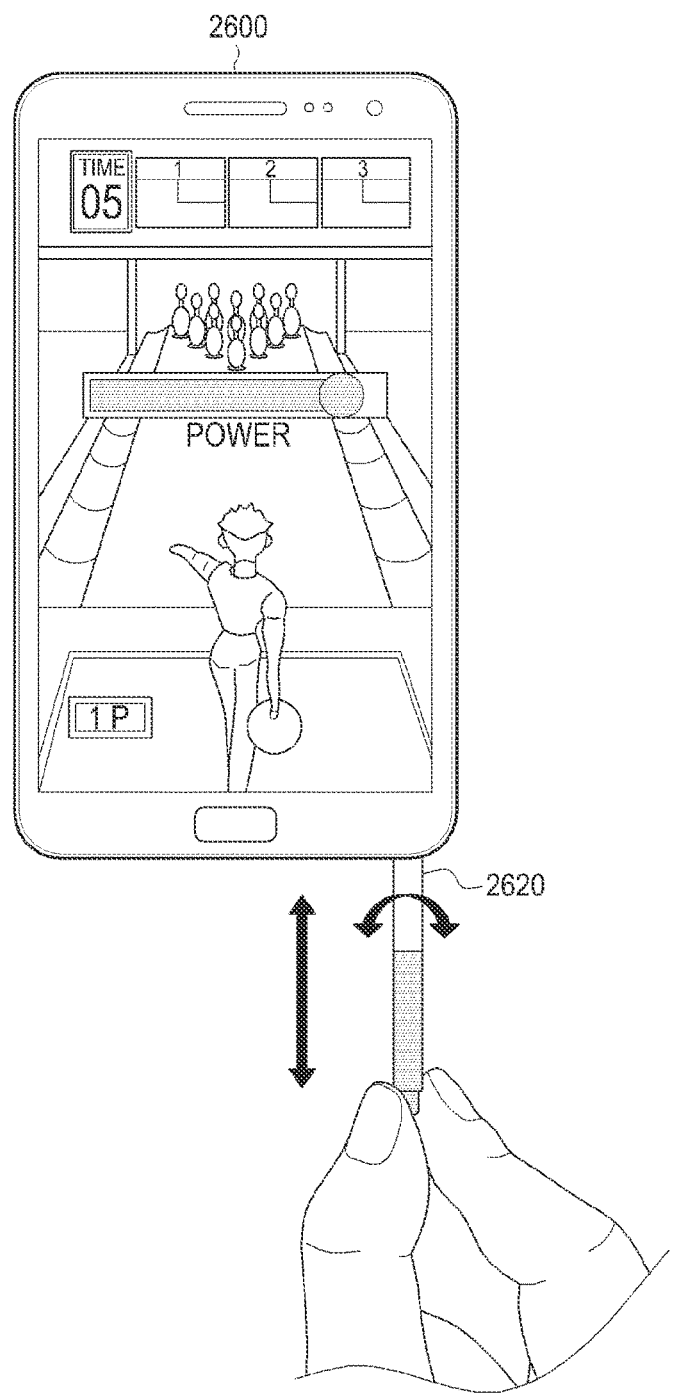
FIG. 26 is a diagram illustrating an example of controlling an input of an application executed by a motion of an electronic pen according to various embodiments of the present invention.

Referring to FIG. 26, according to an embodiment of the present invention, a function of detecting a motion of an electronic pen 2620 is applied to sports games, such as bowling, curling, and baseball, including pushing motions with respect to the electronic device 2600, thereby providing a user experience similar to actual sports.

Figure 27:
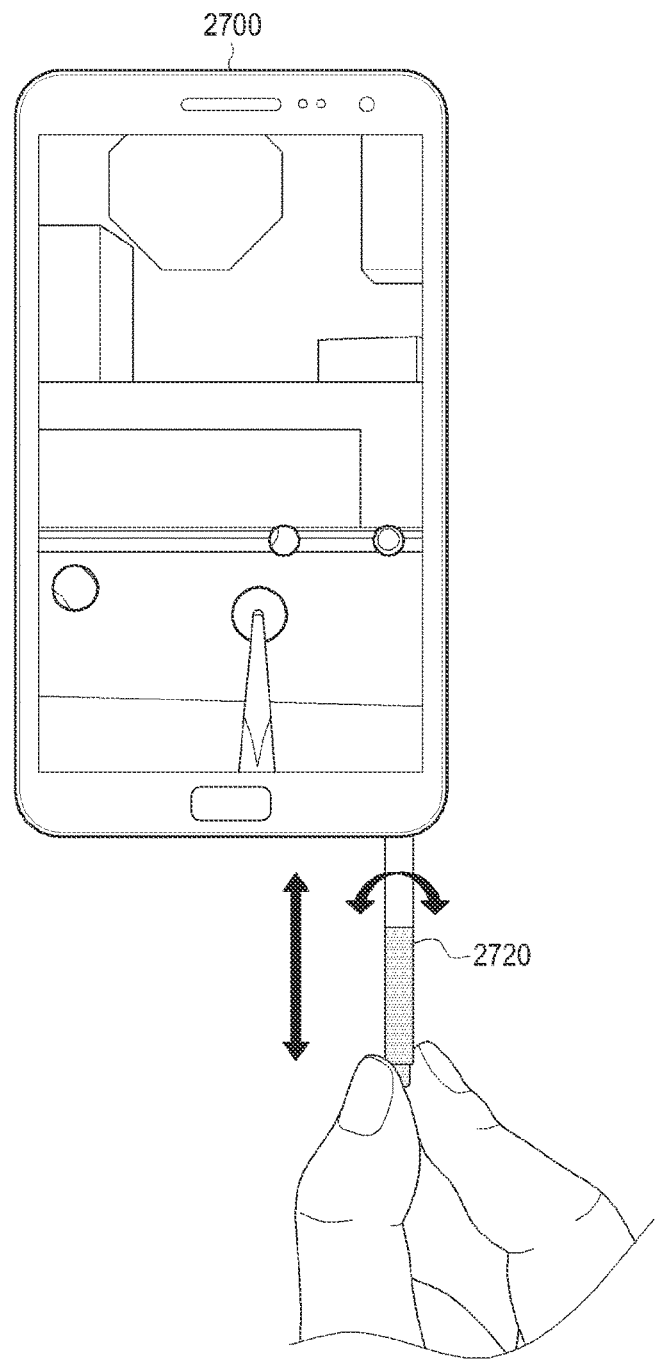
FIG. 27 is a diagram illustrating an example of controlling an input of an application executed by a motion of an electronic pen according to various embodiments of the present invention.

Referring to FIG. 27, when an embodiment of the present invention is applied to a billiard game, an angle is adjusted through a motion sensor, and strength is adjusted using a movement direction and speed of an electronic pen 2720 inside a pen storage unit of an electronic device 2700, thereby providing a user experience similar to the actual billiards. In addition, a setting for a striking point on a billiard ball to hit may be changed by rotating the electronic pen 2720.

Figure 28:
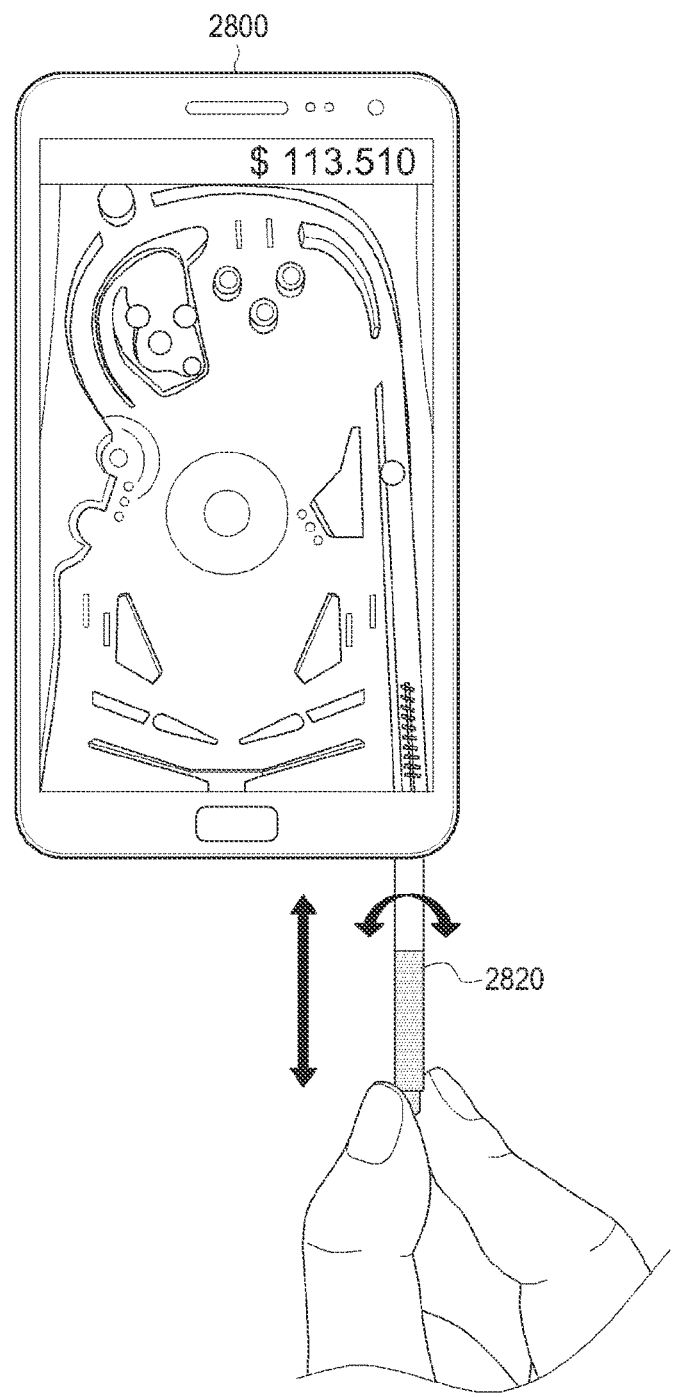
FIG. 28 is a diagram illustrating an example of controlling an input of an application executed by a motion of an electronic pen according to various embodiments of the present invention.

Referring to FIG. 28, according to an embodiment of the present invention, a ball in a pinball game may be propelled by movement of an electronic pen 2820 relative to an electronic device 2800, thereby providing a user experience similar to the actual pinball machine.

Figure 29:
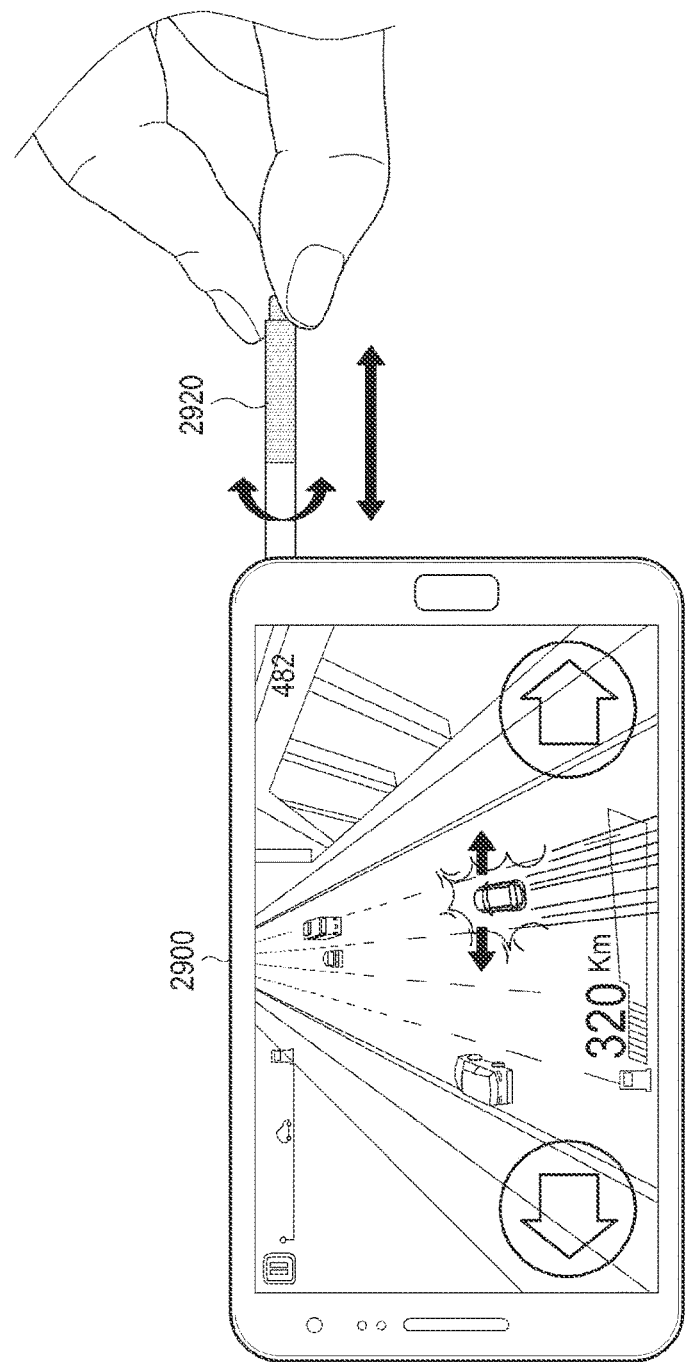
FIG. 29 is a diagram illustrating an example of controlling an input of an application executed by a motion of an electronic pen according to various embodiments of the present invention.

Referring to FIG. 29, according to an embodiment of the present invention, detection of a motion of an electronic pen 2920 relative to an electronic device 2900 is used as a useful analog input tool in a left/right avoidance game, such as avoiding obstacles in a driving game.

Figure 30:
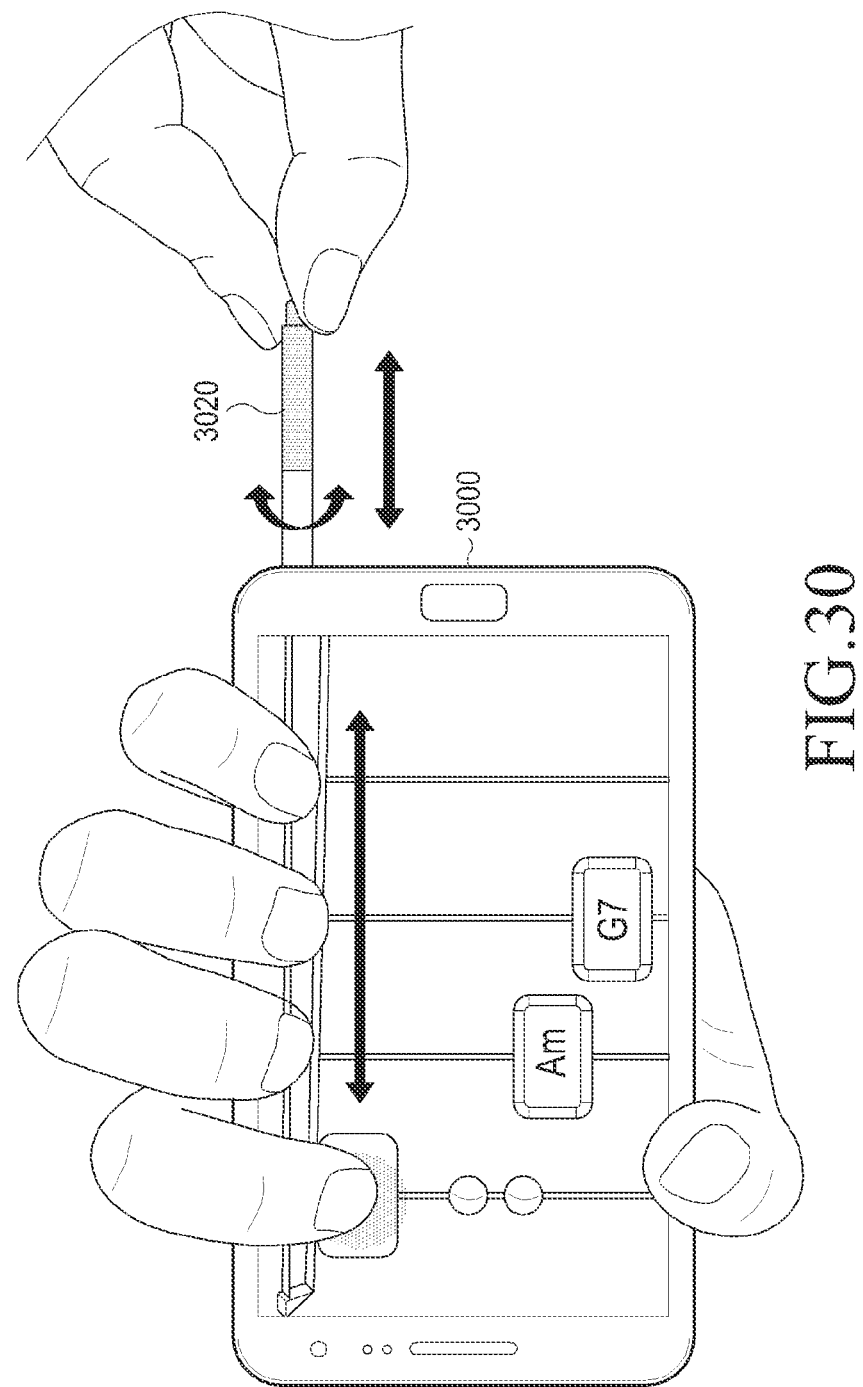
FIG. 30 is a diagram illustrating an example of controlling an input of an application executed by a motion of an electronic pen according to various embodiments of the present invention.

Referring to FIG. 30, according to an embodiment of the present invention, detection of a motion of an electronic pen 3020 relative to an electronic device 3000 is useful as input tool even in the playing simulation of a string instrument, such as a violin and a cello, which is played through an operation of pushing and pulling a bow. In the present example, an operation of pushing or pulling a bow is implemented by moving the electronic pen 3020 inside a pen storage unit of the electronic device 3000, and various playback effects are expressed by rotating the electronic pen 3020.

Figure 31:
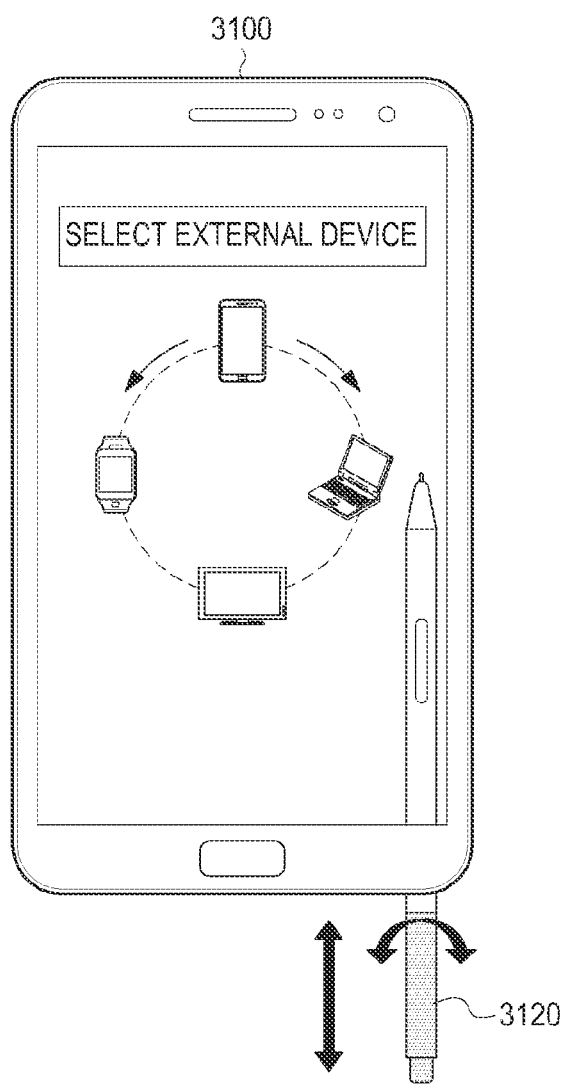
FIG. 31 is a diagram illustrating an example of selecting an external device depending upon a motion of an electronic pen according to various embodiments of the present invention.

FIG. 31 is a diagram illustrating an example of selecting an external device according to a motion of an electronic pen according to various embodiments of the present invention.

Referring to FIG. 31, an external device connected to or paired with an electronic device 3100 may be selected by moving an electronic pen 3120 on an external device selection menu.

For example, as illustrated in FIG. 31, when there is a need to select an external device connected to or paired with the electronic device 3100 (e.g., when there is a need for sharing a file with the external device), the external device is selected by moving the electronic pen 3120 while the external device selection menu is maintained, thereby easily selecting a particular device without switching between separate screens.

According to various embodiments of the present invention, in selecting an external device connected to or paired with the electronic device 3100 and sharing a file, detection of an input or motion of the electronic pen 3120 is used as a tool for selecting a sharing method. For example, the sharing method (e.g., Bluetooth, Wi-Fi, or NFC) may be easily selected by moving or rotating the electronic pen 3120 while a file to be shared and an external device are selected.

Figure 32:
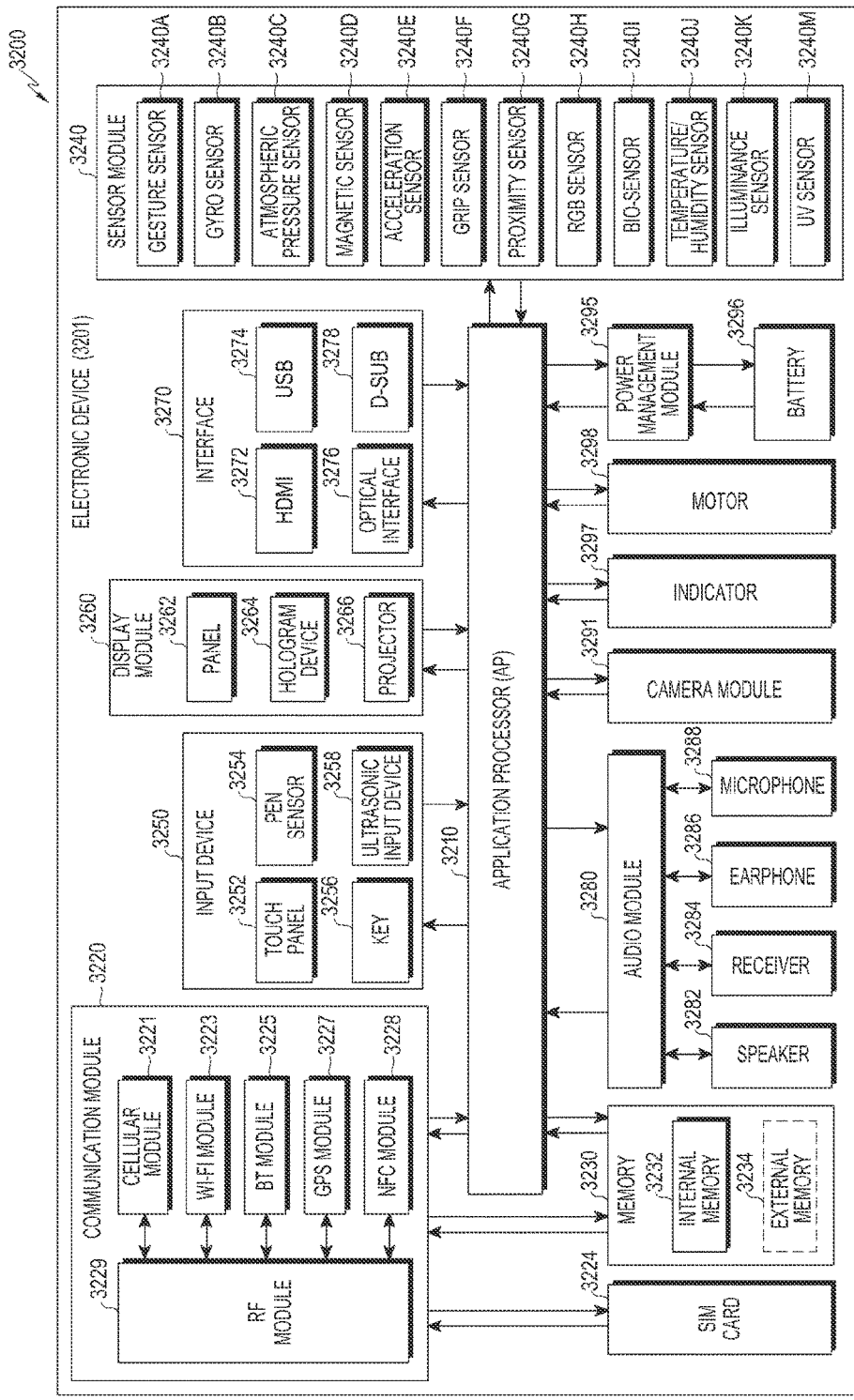
FIG. 32 is a block diagram illustrating a detailed structure of an electronic device according to an embodiment of the present invention.

FIG. 32 is a block diagram illustrating a detailed structure of an electronic device according to an embodiment of the present invention. FIG. 32 includes a block diagram 3200 of an electronic device 3201 according to various embodiments of the present invention. The electronic device 3201 may include, for example, all or a part of the electronic device 101 shown or described with reference to FIG. 1.

Referring to FIG. 32, the electronic device 3201 includes at least one Application Processor (AP) 3210, a communication module 3220, a Subscriber Identification Module (SIM) card 3224, a memory 3230, a sensor module 3240, an input device 3250, a display 3260, an interface 3270, an audio module 3280, a camera module 3291, a power management module 3295, a battery 3296, an indicator 3297, and a motor 3298.

The AP 3210 controls a plurality of hardware or software components connected to the AP 3210 by driving an operating system or an application program, processing various types of data including multimedia data, and performing calculations. The AP 3210 may be embodied as, for example, a System on Chip (SoC). According to an embodiment of the present invention, the AP 3210 may further include a graphic processing unit (GPU).

The communication module 3220 (e.g., the communication interface 160) performs data transmission/reception in communication between the electronic device 3201 (e.g., the electronic device 101) and other electronic devices (e.g., the electronic device 104 and the server 106) connected through a network. According to an embodiment of the present invention, the communication module 3220 includes a cellular module 3221, a Wi-Fi module 3223, a BT module 3225, a GPS module 3227, an NFC module 3228, and a Radio Frequency (RF) module 3229.

The cellular module 3221 may provide a voice call, a video call, a message service, or an internet service through a communication network (e.g., LTE, LTE-A, CDMA, WCDMA, UMTS, WiBro, GSM, or the like). In addition, the cellular module 3221 identifies and authenticates an electronic device in a communication network using the SIM card 3224. According to an embodiment of the present invention, the cellular module 3221 performs at least some functions that the AP 3210 provides. For example, the cellular module 3221 may perform at least a part of a multimedia control function.

According to an embodiment of the present invention, the cellular module 3221 may include a Communication Processor (CP). In addition, the cellular module 3221 may be implemented, for example, in a System on Chip (SOC) shape. In FIG. 32, the components such as the cellular module 3221 (e.g., a communication processor), the memory 3230, and the power management module 3295 are illustrated as components separate from the AP 3210. However, according to an embodiment of the present invention, the AP 3210 may include at least some of the aforementioned components (e.g., the cellular module 3221).

According to an embodiment of the present invention, the AP 3210 or the cellular module 3221 (e.g., communication processor) loads a command or data received from at least one of a non-volatile memory and other elements connected thereto in a volatile memory, and processes the loaded command or data. Furthermore, the AP 3210 or the cellular module 3221 store data received from or generated by at least one of other elements in a non-volatile memory.

The Wi-Fi module 3223, the BT module 3225, the GPS module 3227, and the NFC module 3228 may include, for example, a processor for processing data transmitted/received through the corresponding module. In FIG. 32, the cellular module 3221, the Wi-Fi module 3223, the BT module 3225, the GPS module 3227, and the NFC module 3228 are illustrated as separate blocks. However, according to an embodiment of the present invention, at least some (e.g., two or more) of the cellular module 3221, the Wi-Fi module 3223, the BT module 3225, the GPS module 3227, and the NFC module 3228 may be included in one Integrated Chip (IC) or one IC package. For example, at least some (e.g., the communication processor corresponding to the cellular module 3221 and the Wi-Fi processor corresponding to the Wi-Fi module 2323) of the processors corresponding to the cellular module 3221, the Wi-Fi module 3223, the BT module 3225, the GPS module 3227, and the NFC module 3228 may be implemented by one SoC.

The RF module 3229 may transmit/receive data, for example, an RF signal. Although not illustrated, the RF module 3229 may include, for example, a transceiver, a Power Amp Module (PAM), a frequency filter, a Low Noise Amplifier (LNA), or the like. Furthermore, the RF module 3229 may further include a component for transmitting/receiving an electromagnetic wave over a free air space in wireless communication, for example, a conductor or a conducting wire. The cellular module 3221, the Wi-Fi module 3223, the BT module 3225, the GPS module 3227, and the NFC module 3228 share one RF module 3229 in FIG. 32. However, according to an embodiment of the present invention, at least one of the cellular module 3221, the Wi-Fi module 3223, the BT module 3225, the GPS module 3227, or the NFC module 3228 may transmit/receive an RF signal through a separate RF module.

The SIM card 3224 is inserted into a slot formed in a particular portion of the electronic device. The SIM card 3224 may include unique identification information (e.g., Integrated Circuit Card IDentifier (ICCID)) or subscriber information (e.g., International Mobile Subscriber Identity (IMSI)).

The memory 3230 (e.g., the memory 130) includes an internal memory 3232 and an external memory 3234. The internal memory 3232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, and the like).

According to an embodiment of the present invention, the internal memory 3232 may be a Solid State Drive (SSD). The external memory 3234 may further include a flash drive, for example, a Compact Flash (CF), a Secure Digital (SD), a Micro Secure Digital (Micro-SD), a Mini Secure Digital (Mini-SD), an eXtreme Digital (xD), a memory stick, or the like. The external memory 3234 may be functionally connected to the electronic device 3201 through various interfaces. According to an embodiment of the present invention, the electronic device 3201 may further include a storage device (or storage medium) such as a hard drive.

The sensor module 3240 measures a physical quantity or detects an operating state of the electronic device 3201 and converts the measured or detected information into an electronic signal. The sensor module 3240 includes, for example, at least one of a gesture sensor 3240A, a gyro sensor 3240B, an atmospheric pressure sensor 3240C, a magnetic sensor 3240D, an acceleration sensor 3240E, a grip sensor 3240F, a proximity sensor 3240G, a color sensor 3240H (e.g., a Red, Green, Blue (RGB) sensor), a biometric sensor 3240I, a temperature/humidity sensor 3240J, an illumination sensor 3240K, and a ultraviolet (UV) sensor 3240M. Additionally or alternatively, the sensor module 3240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), an InfraRed (IR) sensor (not illustrated), an iris scanner (not illustrated), and/or a fingerprint sensor (not illustrated). The sensor module 3240 may further include a control circuit for controlling one or more sensors included therein.

The input device 3250 includes a touch panel 3252, a (digital) pen sensor 3254, a key 3256, or an ultrasonic input device 3258. The touch panel 3252 recognizes a touch input through at least one of, for example, a capacitive type, a resistive type, an infrared type, and an ultrasonic type. The touch panel 3252 may further include a control circuit. The capacitive type touch panel may recognize physical contact or proximity. The touch panel 3252 may further include a tactile layer. In this case, the touch panel 3252 may provide a tactile reaction to a user.

The (digital) pen sensor 3254 may be implemented, for example, using a method identical or similar to receiving a touch input of a user, or using a separate recognition sheet. The key 3256 may include, for example, a physical button, an optical key or a keypad. The ultrasonic input device 3258 may identify data by detecting an acoustic wave with a microphone (e.g., microphone 3288) of the electronic device 3201 through an input unit for generating an ultrasonic signal, and may perform wireless recognition. According to an embodiment of the present invention, the electronic device 3201 also receives a user input from an external device (e.g., a computer or a server) connected thereto using the communication module 3220.

The display 3260 (e.g., the display 150) includes a panel 3262, a hologram device 3264, or a projector 3266. The panel 3262 may be, for example, a Liquid Crystal Display (LCD) or Active-Matrix Organic Light Emitting Diode (AM-OLED). The panel 3262 may be implemented to be, for example, flexible, transparent, or wearable. Together with the touch panel 3252, the panel 3262 may be also configured as one module. The hologram device 3264 shows a stereoscopic image in the air by using interference of light. The projector 3266 projects light onto a screen to display an image. For example, the screen may be located inside or outside the electronic device 3201. According to an embodiment of the present invention, the display 3260 further includes a control circuit for controlling the panel 3262, the hologram unit 3264, or the projector 3266.

The interface 3270 may include, for example, a High-Definition Multimedia Interface (HDMI) 3272, a Universal Serial Bus (USB) 3274, an optical interface 3276, or a D-subminiature (D-sub) 3278. The interface 3270 is included in, for example, the communication interface 160 illustrated in FIG. 1. Additionally or alternatively, the interface 3270 may include, for example, a Mobile High-definition Link (MHL) interface, a Secure Digital (SD) card/Multi-Media Card (MMC) interface, or an Infrared Data Association (IrDA) standard interface.

The audio module 3280 bidirectionally converts a sound and an electronic signal. At least some components of the audio module 3280 may be included in, for example, the input/output interface 140 illustrated in FIG. 1. The audio module 3280 processes voice information input or output through, for example, a speaker 3282, a receiver 3284, earphones 3286, the microphone 3288 or the like.

The camera module 3291 is a device that can capture still and moving images, and according to an embodiment of the present invention, may include one or more image sensors (e.g., a front sensor or a rear sensor), a lens, an Image Signal Processor (ISP), or a flash (e.g., an LED or a xenon lamp, not illustrated).

The power management module 3295 may manage power of the electronic device 3201. Although not illustrated, the power management module 3295 may include, for example, a Power Management Integrated Circuit (PMIC), a charger Integrated Circuit (IC), or a battery gauge.

The PMIC may be mounted to, for example, an integrated circuit or an SoC semiconductor. Charging methods may be classified into a wired charging method and a wireless charging method. The charger IC is able to charge a battery and prevent over voltage or over current from being flowed from a charger. According to an embodiment of the present invention, the charger IC includes a charger IC for at least one of the wired charging method and the wireless charging method. A magnetic resonance type, a magnetic induction type, or an electromagnetic type may be exemplified as the wireless charging method, and an additional circuit for wireless charging, such as a coil loop circuit, a resonance circuit, a rectifier circuit, and the like may be added.

The battery fuel gauge measures, for example, the remaining amount of battery, a charging voltage and current, or temperature. The battery 3296 stores or generates electricity, and supplies power to the electronic device 3201 using the stored or generated electricity. The battery 3296 includes, for example, a rechargeable battery or a solar battery.

The indicator 3297 displays a particular status, for example a booting status, a message status, a charging status, and the like, of the electronic device 3201 or a part (e.g., the AP 3210) of thereof. The motor 3298 converts an electrical signal to a mechanical vibration. Although not illustrated, the electronic device 3201 may include a processing unit (e.g., a GPU) for supporting a mobile TV function. The processing device for supporting the mobile TV may process, for example, media data according to a standard of Digital Multimedia Broadcasting (DMB), Digital Video Broadcasting (DVB), media flow, or the like.

Each of the above described elements of an electronic device according to various embodiments of the present invention may be formed of one or more components, and the name of a corresponding element may vary according to the type of an electronic device. An electronic device according to various embodiments of the present invention may be formed to include at least one of the above described components, and some of the components may be omitted or additional components may be further included. Further, some of the elements of the electronic device according to various embodiments of the present invention may be coupled to form a single entity while performing the same functions as those of the corresponding elements before the coupling.

The term "module" as used with respect to various embodiments of the present invention herein may refer to, for example, a unit including one of hardware, software, and firmware or any combination of two or more of them. The "module" may be interchangeably used with a term, such as unit, logic, logical block, component, or circuit. The "module" may be the smallest unit of an integrated component or a part thereof. The "module" may be the smallest unit that performs one or more functions or a part thereof. The "module" may be mechanically or electronically implemented. For example, the "module" according to various embodiments of the present invention may include at least one of an Application-Specific Integrated Circuit (ASIC) chip, a Field-Programmable Gate Array (FPGA), and a programmable-logic device for performing certain operations, which are now known or will be developed in the future.

At least some of the devices (e.g., modules or functions thereof) or methods (e.g., operations) according to various embodiments of the present invention may be implemented by, for example, by a command stored in a computer-readable storage medium in the form of a programming module. When the command is executed by one or more processors (e.g., the processor 210), the one or more processors may execute a function corresponding to the command. The computer-readable storage medium may be, for example, the memory 220. At least some of the programming modules may be implemented (e.g., executed) by, for example, the processor 210. At least a part of the programming module may include, for example, a module, a program, a routine, a set of instructions and/or a process for performing one or more functions.

The computer readable recoding medium may include magnetic media, such as a hard disk, a floppy disk and a magnetic tape, optical media, such as a Compact Disc Read Only Memory (CD-ROM) and a Digital Versatile Disc (DVD), magneto-optical media, such as a floptical disk, and a hardware device specially configured to store and execute a program instruction (e.g., a programming module), such as a Read Only Memory (ROM), a Random Access Memory (RAM), a flash memory, and the like. In addition, the program instructions may include high class language codes, which can be executed in a computer by using an interpreter, as well as machine codes made by a compiler. The aforementioned hardware device may be configured to operate as one or more software modules in order to perform the operation of the present invention, and vice versa.

Any of the modules or programming modules according to various embodiments of the present invention may include at least one of the above described elements, exclude some of the elements, or further include other additional elements. The operations performed by the modules, programming module, or other elements according to various embodiments of the present invention may be executed in a sequential, parallel, repetitive, or heuristic manner. Further, some operations may be executed according to another order or may be omitted, or other operations may be added.

According to various embodiments of the present invention, in a storage medium with instructions stored therein, the instructions are configured such that at least one processor performs at least one operation when executing the instructions, and the at least one operation may include: detecting a motion of an electronic pen received in a pen storage unit of the electronic device; in response to the detection of the motion of the electronic pen, determining information related to the motion of the electronic pen; and executing at least one function configured in correspondence to the information related to the motion of the electronic pen.

Various embodiments of the present invention disclosed in this specification and the drawings are merely specific examples presented in order to easily describe technical details of the present invention and to help the understanding of the present disclosure, and are not intended to limit the scope of the present invention. Therefore, it should be construed that, in addition to the embodiments disclosed herein, all modifications and changes or modified and changed forms derived from the technical idea of various embodiments of the present invention fall within the scope of the present invention.

What is claimed is:

1. An electronic device comprising:
a pen storage unit configured to receive an electronic pen;
a touch screen display; and
a processor configured to:
display a first portion of a virtual electronic pen on a first position of the touch screen display, wherein the first position corresponds to a position of the electronic pen in the pen storage unit,
in response to a change of the position of the electronic pen in the pen storage unit, display a second portion of the virtual electronic pen on a second position of the touch screen display, wherein the second position corresponds to the changed position of the electronic pen in the pen storage unit,
determine a motion of the electronic pen inserted into the pen storage unit,
in response to the motion of the electronic pen, determine information related to the motion of the electronic pen, and
execute at least one function corresponding to the information related to the motion of the electronic pen.

2. The electronic device of claim 1, wherein the information related to the motion of the electronic pen includes at least one information item selected from a group including an indication movement, an indication of non-movement, a movement direction, a movement speed, a movement distance, a movement pattern, and a moved location of the electronic pen.

3. The electronic device of claim 1, wherein the information related to the motion of the electronic pen includes at least one information item selected from a group including an indication of rotation, an indication of non-rotation, a rotation direction, a rotation speed, a rotation angle, a rotation pattern, and a rotated location of the electronic pen.

4. The electronic device of claim 1,
wherein the touch screen display comprises a touch screen panel,
wherein the touch screen panel determines the movement of the electronic pen by detecting a part including a material having a high-capacitance provided at one portion of the electronic pen below the touch screen panel.

5. The electronic device of claim 4, wherein the touch screen panel is disposed on a surface of the electronic device and is bent from an upper portion of the electronic device to extend to one side surface of the pen storage unit, and the motion of the electronic pen is detected by a region extending to the one side surface of the pen storage unit among regions of the touch screen panel.

6. The electronic device of claim 1, further comprising:
a touch panel provided in at least a portion of the pen storage unit,
wherein the touch panel determines the movement of the electronic pen by detecting a part including a material having a high-capacitance provided at one portion of the electronic pen.

7. The electronic device of claim 1, wherein the electronic pen includes an input unit including a button, and
wherein the processor is further configured to determine an input by detecting a change in impedance generated according to an input through the button provided in the electronic pen.

8. The electronic device of claim 1, wherein the electronic pen includes an asymmetric rotating weight therein, and wherein the processor is further configured to detect a motion related to rotation of the electronic pen according to a motion of the asymmetric rotating weight.

9. The electronic device of claim 1, further comprising:
at least one magnetic sensor disposed adjacent to the pen storage unit; and
at least one magnetic body secured to the electronic pen, wherein the magnetic sensor is configured to detect a rotation of the at least one magnetic body according to a rotation of the electronic pen.

10. The electronic device of claim 1, further comprising:
a detection switch that detects separation of the electronic pen inserted into the pen storage unit,
wherein the processor is further configured to control activation of a function for detecting the motion of the electronic pen, when the detection switch detects the separation of the electronic pen.

11. A method of operating an electronic device, comprising:
displaying a first portion of a virtual electronic pen on a first position of a touch screen display of the electronic device, wherein the first position corresponds to a position of an electronic pen in a pen storage unit of the electronic device;
in response to a change of the position of the electronic pen in the pen storage unit of the electronic device, displaying a second portion of the virtual electronic pen on a second position of the electronic device, wherein the second position corresponds to the changed position of the electronic pen in the pen storage unit;
detecting a motion of the electronic pen received in the pen storage unit of the electronic device;
in response to the motion of the electronic pen, determining information related to the motion of the electronic pen; and
executing at least one function corresponding to the information related to the motion of the electronic pen.

12. The method of claim 11, wherein the information related to the motion of the electronic pen includes at least one information item selected from a group including an indication of whether there is movement, a movement direction, a movement speed, a movement distance, a movement pattern, and a moved location of the electronic pen.

13. The method of claim 11, wherein the information related to the motion of the electronic pen includes at least one information item selected from a group including an indication of rotation, an indication of non-rotation, a rotation direction, a rotation speed, a rotation angle, a rotation pattern, and a rotated location of the electronic pen.

14. The method of claim 11, further comprising:
detecting separation of the electronic pen inserted into the pen storage unit; and
activating a function for detecting the motion of the electronic pen when the separation of the electronic pen is detected.

15. The method of claim 11, further comprising:
displaying, on the screen, at least one application corresponding to the information related to the motion of the electronic pen;
detecting an additional input through the electronic pen; and
executing a function related to an application corresponding to a location to which the electronic pen is moved, in response to the additional input through the electronic pen.

16. The method of claim 15, wherein the additional input is an input detected according to at least one of rotation, movement, and a button input of the electronic pen.

17. The method of claim 11, further comprising:
displaying at least one setting for the electronic device that corresponds to the information related to the motion of the electronic pen;
detecting an additional input through the electronic pen; and
adjusting a setting value corresponding to a location where the electronic pen is moved, in response to the additional input through the electronic pen.

18. The method of claim 11, further comprising:
determining at least one password corresponding to the information related to the motion of the electronic pen; and
comparing the at least one password corresponding to the information related to the motion of the electronic pen with a preset unlock password and unlocking the electronic device.

19. The method of claim 11, further comprising:
detecting a motion pattern according to a motion direction of the electronic pen;
comparing the motion pattern of the electronic pen with a preset pattern; and
unlocking the electronic device according to a result of the comparison.

20. A non-transitory computer readable recording medium in which a program to be executed in a computer is recorded, wherein the program comprises executable instructions that allow a processor to perform a method comprising:
displaying a first portion of a virtual electronic pen on a first position of a touch screen display of an electronic device, wherein the first position corresponds to a position of an electronic pen in a pen storage unit of the electronic device;
in response to a change of the position of the electronic pen in the pen storage unit of the electronic device, displaying a second portion of the virtual electronic pen on a second position of the electronic device, wherein the second position corresponds to the changed position of the electronic pen in the pen storage unit;
determining a motion of the electronic pen received in the pen storage unit of the electronic device;
in response to the motion of the electronic pen, determining information related to the motion of the electronic pen; and
executing at least one function corresponding to the information related to the motion of the electronic pen.

* * * * *